US012712252B2

(12) United States Patent
Kato et al.

(10) Patent No.: US 12,712,252 B2
(45) Date of Patent: Aug. 18, 2026

(54) EBG STRUCTURE-ATTACHED GLASS PLATE AND VEHICLE ANTENNA DEVICE

(71) Applicant: AGC Inc., Tokyo (JP)

(72) Inventors: Yusuke Kato, Tokyo (JP); Shoichi Takeuchi, Tokyo (JP); Hideaki Shoji, Tokyo (JP); Toshiki Sayama, Tokyo (JP)

(73) Assignee: AGC INC., Tokyo (JP)

( * ) Notice: Subject to any disclaimer, the term of this patent is extended or adjusted under 35 U.S.C. 154(b) by 126 days.

(21) Appl. No.: 18/754,128

(22) Filed: Jun. 25, 2024

(65) Prior Publication Data

US 2024/0347894 A1 Oct. 17, 2024

Related U.S. Application Data

(63) Continuation of application No. PCT/JP2022/047367, filed on Dec. 22, 2022.

(30) Foreign Application Priority Data

Dec. 27, 2021 (JP) ................................ 2021-213430

(51) Int. Cl.

| | |
|---|---|
| ***H01Q 1/12*** | (2006.01) |
| ***H01Q 1/32*** | (2006.01) |
| ***H01Q 9/04*** | (2006.01) |
| ***H01Q 15/00*** | (2006.01) |

(52) U.S. Cl.

CPC ......... *H01Q 1/1271* (2013.01); *H01Q 1/3233* (2013.01); *H01Q 9/0407* (2013.01); *H01Q 15/006* (2013.01)

(58) Field of Classification Search

CPC .. H01Q 1/1271; H01Q 1/3233; H01Q 9/0407; H01Q 15/006

See application file for complete search history.

(56) References Cited

U.S. PATENT DOCUMENTS

| | | | | |
|---|---|---|---|---|
| 2013/0050044 | A1 | 2/2013 | Inoue | |
| 2013/0241778 | A1 | 9/2013 | Orime et al. | |
| 2020/0388924 | A1* | 12/2020 | Lee | H01Q 9/045 |
| 2021/0029821 | A1 | 1/2021 | Hwang et al. | |

(Continued)

FOREIGN PATENT DOCUMENTS

| | | | |
|---|---|---|---|
| JP | 2009-044697 | A | 2/2009 |
| JP | 5697056 | B2 | 4/2015 |
| JP | 5718315 | B2 | 5/2015 |

(Continued)

OTHER PUBLICATIONS

International Searching Authority, "International Search Report," issued in connection with International Patent Application No. PCT/JP2022/047367, dated Mar. 14, 2023.

(Continued)

*Primary Examiner* — Daniel Munoz

(74) *Attorney, Agent, or Firm* — Foley & Lardner LLP

(57) ABSTRACT

An EBG structure-attached glass plate includes a vehicle roof glass for attachment to a metal frame of a vehicle body, an EBG structure that is disposed on a first main face of the roof glass, that has a predetermined conductor pattern periodically disposed thereon, and that is formed in a frame shape, and a radio wave transmitting and receiving region surrounded by the EBG structure.

18 Claims, 26 Drawing Sheets

(56) References Cited

U.S. PATENT DOCUMENTS

2021/0210857 A1* 7/2021 Sayama ............... H01Q 9/0457
2022/0006178 A1* 1/2022 Shimura .................. H01Q 1/42

FOREIGN PATENT DOCUMENTS

JP 2019-114824 A 7/2019
JP 2021-022915 A 2/2021

OTHER PUBLICATIONS

International Searching Authority, "Written Opinion," issued in connection with International Patent Application No. PCT/JP2022/047367, dated Mar. 14, 2023.

* cited by examiner

UNIT : dBi

EBG STRUCTURE-ATTACHED GLASS PLATE AND VEHICLE ANTENNA DEVICE

CROSS-REFERENCE TO RELATED APPLICATIONS

This application is a continuation of International Application No. PCT/JP2022/047367, filed on Dec. 22, 2022, which claims priority from Japanese Patent Application No. 2021-213430, filed on Dec. 27, 2021. The entire disclosure of each of the above applications is incorporated herein by reference.

BACKGROUND

Technical Field

The present invention relates to an EBG structure-attached glass plate and a vehicle antenna device.

Related Art

In recent years there has been a trend to dispose various antennas on vehicles, from antennas that receive broadcast radio waves of frequencies of up to 710 MHz, such as frequency modulation (FM), digital audio broadcast (DAB), and terrestrial digital television broadcasts (DTV), antennas used in intelligent transport systems (ITS) to receive frequencies of a 760 MHz band, global navigation satellite system (GNSS) antennas of a 1.2 GHz band or 1.6 GHz band used in satellite communication, and furthermore communication antennas such as 4th generation mobile communication system-long term evolution (4G-LTE) antennas or 5th generation mobile communication system-sub6 (5G-Sub6) antennas or the like that transmit and receive frequencies of up to 6 GHz as an informatics band or a vehicle-to-everything (V2X) band. There are attempts being made to dispose such antennas on vehicle glass plates (see, for example, Japanese Patent Application Laid-Open (JP-A) No. 2009-44697).

JP-A No. 2009-44697 discloses technology in which a film antenna is stuck to an upper section of a vehicle front glass, and an electromagnetic band gap (EBG) is formed on the front glass at the boundary between the front glass and a frame of the vehicle. JP-A No. 2009-44697 describes a drop in radiation resistance (impedance) being suppressed and good electrical characteristics being obtained thereby.

However, in the technology described in JP-A No. 2009-44697, the EBG is disposed such that the film antenna follows the closest frame-piece, and encounters the issues in that surface waves propagating in the front glass surrounded by a metal film are not able to be sufficiently controlled, and there is a drop in antenna gain.

SUMMARY

In consideration of the above circumstances, an object of the present invention is to obtain an EBG structure-attached glass plate and a vehicle antenna device that are capable of controlling surface waves of a glass plate and capable of suppressing a drop in antenna gain.

An EBG structure-attached glass plate according to the present disclosure includes a vehicle glass plate for attachment to a metal frame of a vehicle body, an EBG structure that is disposed on a main face of the glass plate, that has a predetermined conductor pattern periodically disposed thereon, and that is formed in a frame shape, and a radio wave transmitting and receiving region surrounded by the EBG structure.

The EBG structure-attached glass plate according to the present invention controls surface waves of the glass plate and enables a drop in antenna gain to be suppressed.

BRIEF DESCRIPTION OF DRAWINGS

Exemplary embodiments of the present invention will be described in detail based on the following figures, wherein.

DETAILED DESCRIPTION

First Exemplary Embodiment

Figure 1:
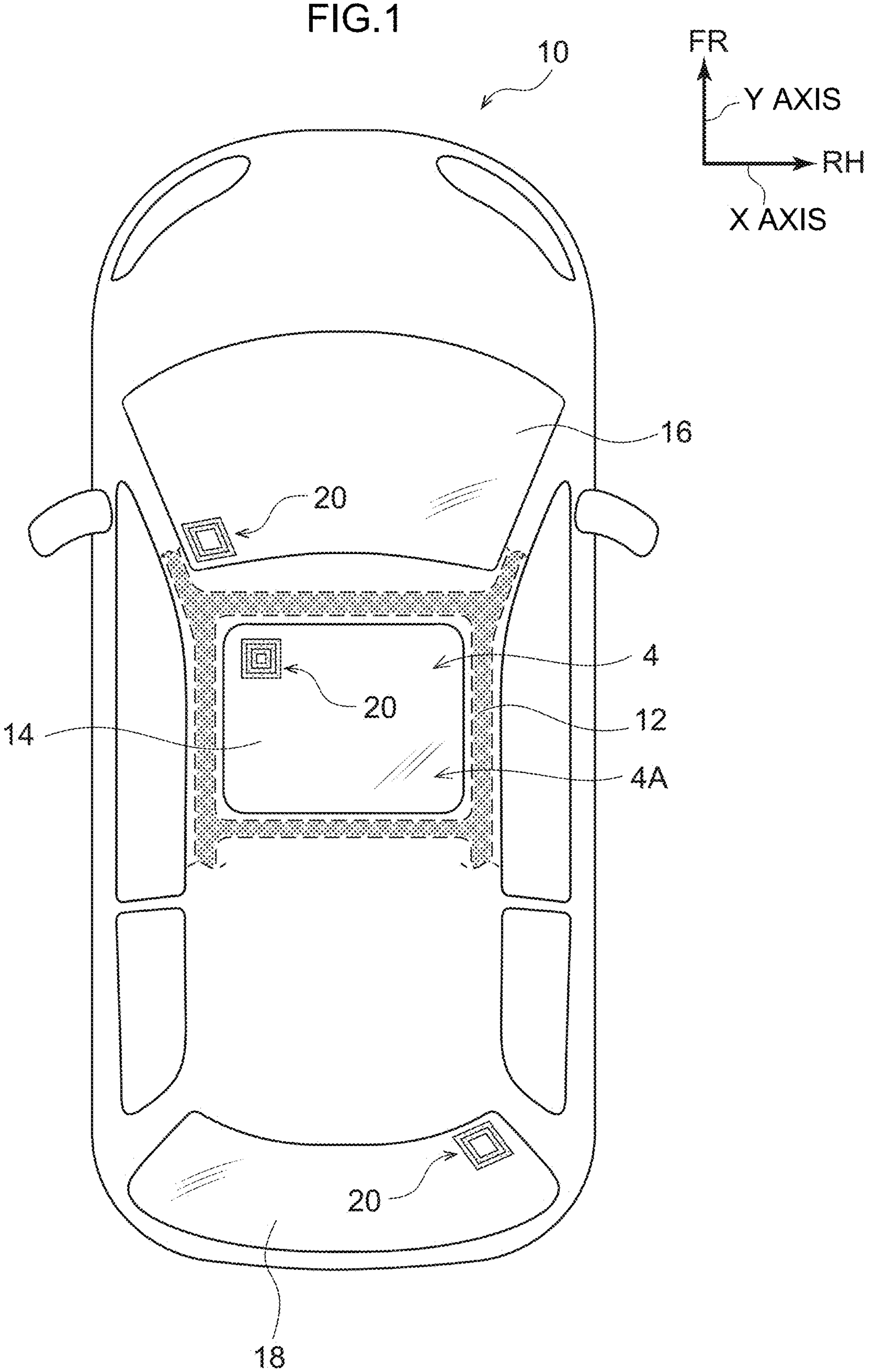
FIG. 1 is a plan view of a vehicle antenna device according to a first exemplary embodiment, viewed along a vertical direction of a vehicle attached therewith.

Description follows regarding an EBG structure-attached glass plate and vehicle antenna device according to a first exemplary embodiment, with reference to the drawings. Note that as appropriate in the drawings, an X axis is parallel to a vehicle width direction, a Y axis is parallel to a vehicle front-rear direction, and a Z axis is parallel to a vehicle up-down direction. Furthermore, an arrow FR indicates forward in the vehicle front-rear direction, an arrow UP indicates upward in the vehicle up-down direction, and an arrow RH indicates right in the vehicle width direction. An upward direction in the vertical directions is taken as being a zenith direction, an opposite direction to the zenith direction (i.e. downward direction) is taken as being a nadir direction, and a direction perpendicular to the vertical direction is taken as being a horizontal direction. An XY plane is a plane passing through the X axis and the Y axis, an XZ plane is a plane passing through the X axis and the Z axis, and a YZ plane is a plane passing through the Y axis and the Z axis. In the following description, a vehicle 10 is positioned on a horizontal plane, with the vehicle up-down direction aligned with the vertical direction, with the XY plane aligned with a horizontal plane, and with the vertical direction corresponding to a normal direction with respect to the horizontal plane.

An EBG structure-attached glass plate and a vehicle antenna device of the first exemplary embodiment will now be described for an example applied to a normal automobile (hereafter referred to as vehicle) equipped with a roof glass.

Configuration

Figure 2:
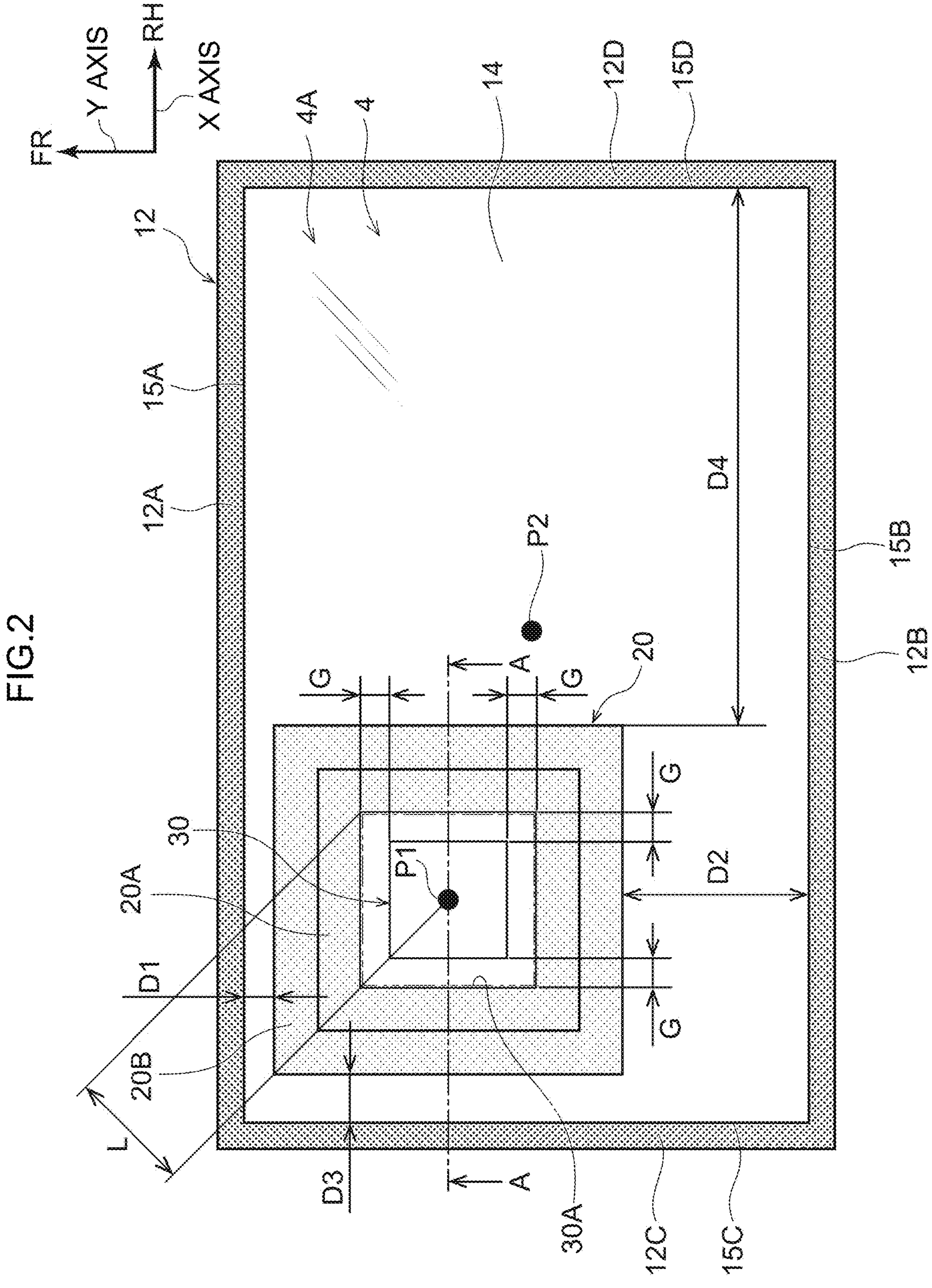
FIG. 2 is a schematic plan view schematically illustrating a roof glass and peripheral components thereto, when a roof glass according to the first exemplary embodiment is viewed in a plate thickness direction from a vehicle cabin outside.
Figure 3:
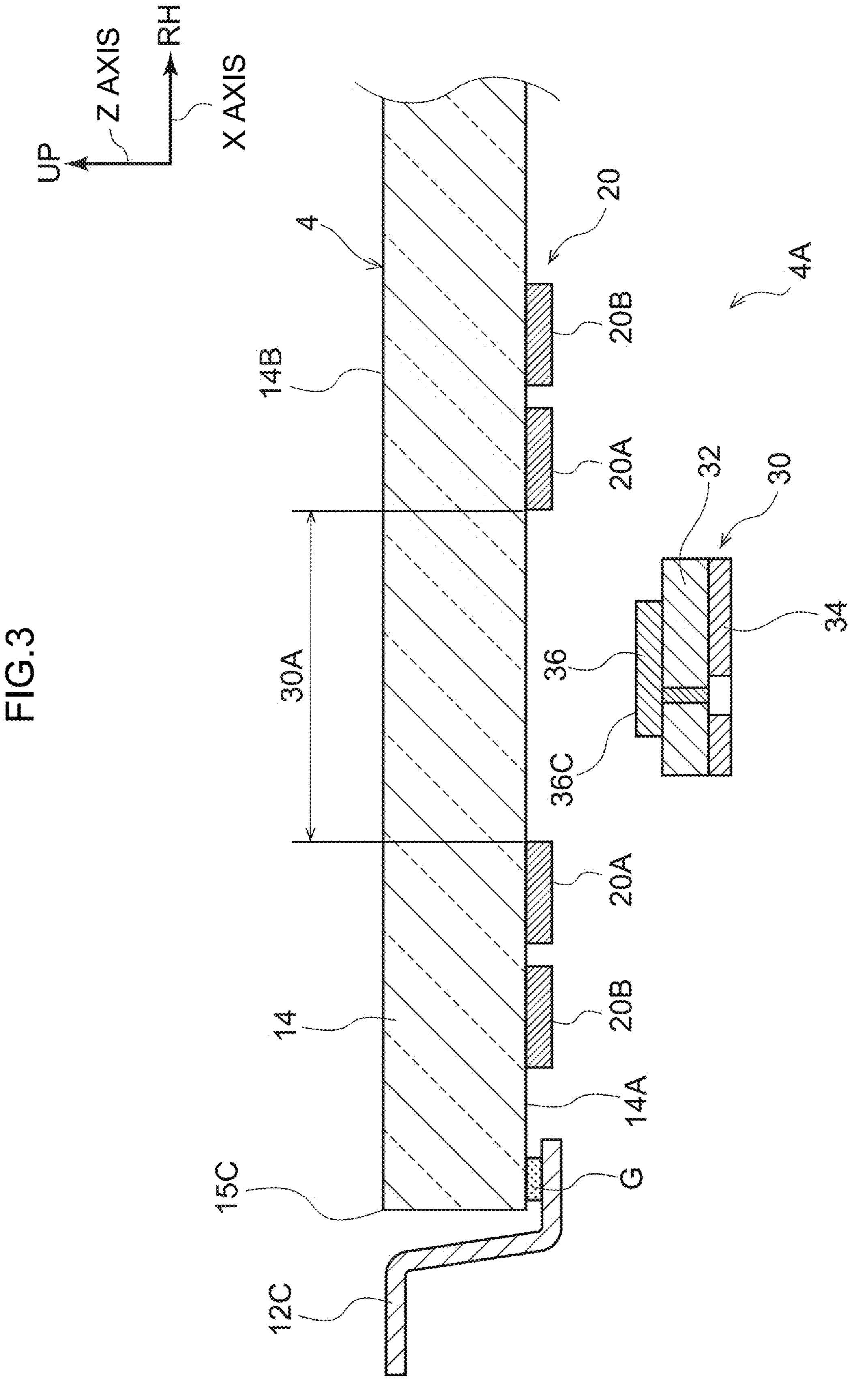
FIG. 3 is a cross-section illustrating a roof glass according to the first exemplary embodiment, illustrated in a cross-section taken along A-A of FIG. 2.

FIG. 1 is a plan view of a vehicle 10 applied with a vehicle antenna device 4A according to the present exemplary embodiment, viewed from a vertical direction. As illustrated in FIG. 1, the vehicle 10 includes a windshield (front glass) 16 serving as a glass plate, a roof glass 14, and a rear glass 18. FIG. 2 is a plan view illustrating the roof glass 14 viewed along a plate thickness direction from the vehicle cabin outside, and FIG. 3 is a cross-section taken along A-A of FIG. 2. As illustrated in FIG. 3, a windshield 16, the roof glass 14, and the rear glass 18 are attached by an adhesive G, for example a urethane resin or the like, to a metal frame (for example, a metal flange) 12C of a vehicle body.

Roof Glass 14

As illustrated in FIG. 2 and FIG. 3, the roof glass 14 is formed in a substantially rectangular plate shape, and is provided such that a thickness direction thereof is in a substantially vertical direction. The roof glass 14 may be applied as a single layer glass plate (single pane glass) including a first main face 14B serving as a main face on a vehicle cabin outside, and a second main face 14A serving as a main face on the vehicle cabin inside. Note that the roof glass 14 may be a laminated glass having an intermediate film such as a resin film sandwiched between a pair of glass plates. The laminated glass may be photochromatic glass including a photochromatic layer having a photochromatic function disposed between the pair of glass plates. However, in cases in which an antenna 30, described later, is provided to a laminated glass including a functional layer such as a photochromatic film or the like, the antenna 30 needs to be disposed so as not to overlap in the glass plate thickness direction with any conductor film contained in such a functional layer. In the following, unless explicitly stated otherwise, the roof glass 14 will be described for a single pane glass or a laminated glass not equipped with a conductor film.

As illustrated in FIG. 2, an electromagnetic band gap (EBG) structure 20 and an antenna 30 are disposed on the roof glass 14. The roof glass 14 having the EBG structure 20 attached thereto configures an EBG structure-attached glass plate 4. The roof glass 14, the EBG structure 20, and the antenna 30 configure a vehicle antenna device 4A.

As illustrated in FIG. 2, the roof glass 14 includes a radio wave transmitting and receiving region 30A that is a region surrounded by the EBG structure 20 when viewed along a plate thickness direction of the roof glass 14. In other words, the radio wave transmitting and receiving region 30A is a region surrounded by an inner edge of an EBG structure 20, and the outer edge of the radio wave transmitting and receiving region 30A corresponds to the inner edge of the EBG structure 20 when viewed along the plate thickness direction of the roof glass 14.

Metal Frame 12

As illustrated in FIG. 2, a metal frame 12 formed in a substantially rectangular frame shape is disposed at an outer peripheral edge of the roof glass 14. The metal frame 12 includes a first metal frame-piece 12A disposed at a vehicle front side, a second metal frame-piece 12B disposed at a vehicle rear side, a third metal frame-piece 12C disposed at a vehicle left side, and a fourth metal frame-piece 12D disposed at a vehicle right side.

A vehicle front-rear direction front side end of the roof glass 14 is attached to the first metal frame-piece 12A, and a rear side end thereof is attached to the second metal frame-piece 12B. A vehicle width direction left side end of the roof glass 14 is also attached to a third metal frame-piece 12C, and a right side end thereof is attached to the fourth metal frame-piece 12D.

Antenna 30

As the antenna 30, a patch antenna (microstrip antenna) serving as a GNSS antenna (an example of a satellite communication antenna) can be applied that receives dextrorotatory polarized waves (one example of radio waves) of at least one of a 1.2 GHz band or a 1.6 GHz band transmitted from a global navigation satellite system (GNSS). The antenna 30 is not limited to GNSS use, and may be an antenna capable of receiving a signal of an S band satellite digital audio radio service (SDARS) of a 2.3 GHz band.

As illustrated in FIG. 2, the antenna 30 is disposed further to a front side than a vehicle front-rear direction center of the roof glass 14 and further to a left side than a vehicle width direction center, when viewed along the thickness direction of the roof glass 14. In other words, the antenna 30 is disposed in the vicinity of an internal corner between the first metal frame-piece 12A and the third metal frame-piece 12C. Namely, the antenna 30 is disposed in the vicinity of a corner of the roof glass 14.

As illustrated in FIG. 3, the antenna 30 is attached to the metal frame 12 or to the roof glass 14 through a non-illustrated bracket, such that a radiation face 36C of a radiation plate 36, described later, is separated from the roof glass 14. Note that the antenna 30 may be directly attached to the roof glass 14, and may be indirectly attached through a dielectric such as resin or the like. Furthermore, attachment may be made such that the radiation face 36C of the radiation plate 36 contacts a face on the vehicle cabin inside of a glass plate, such as the roof glass 14.

The antenna 30 is provided such that the radiation face 36C faces toward the second main face 14A of the roof glass 14, and is attached in a state in which a normal to the radiation face 36C faces in the zenith direction. When doing so the antenna 30 is attached such that the radiation face 36C is substantially parallel to a horizontal plane.

Figure 4:
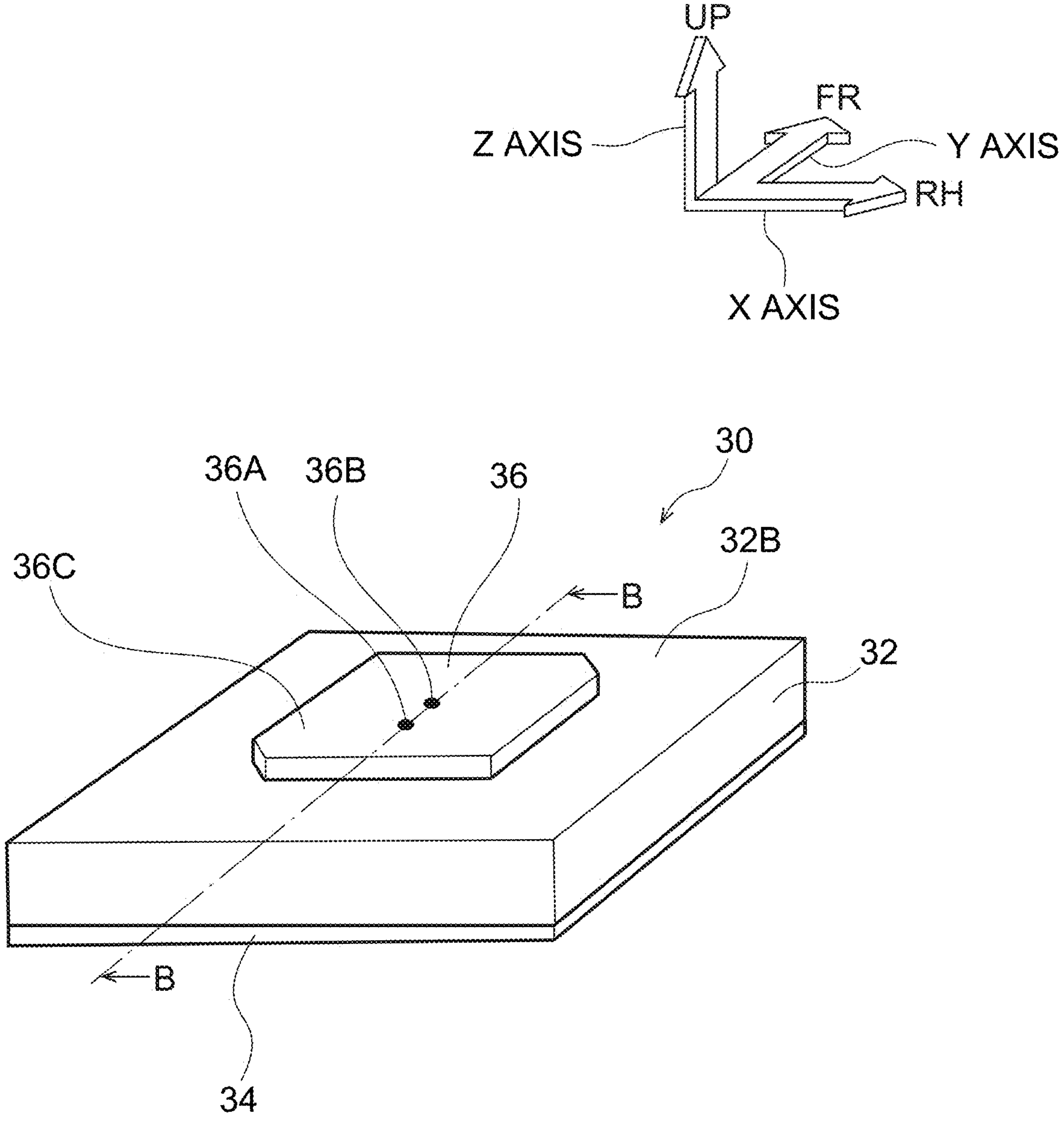
FIG. 4 is a perspective view illustrating an antenna according to the first exemplary embodiment.
Figure 5:
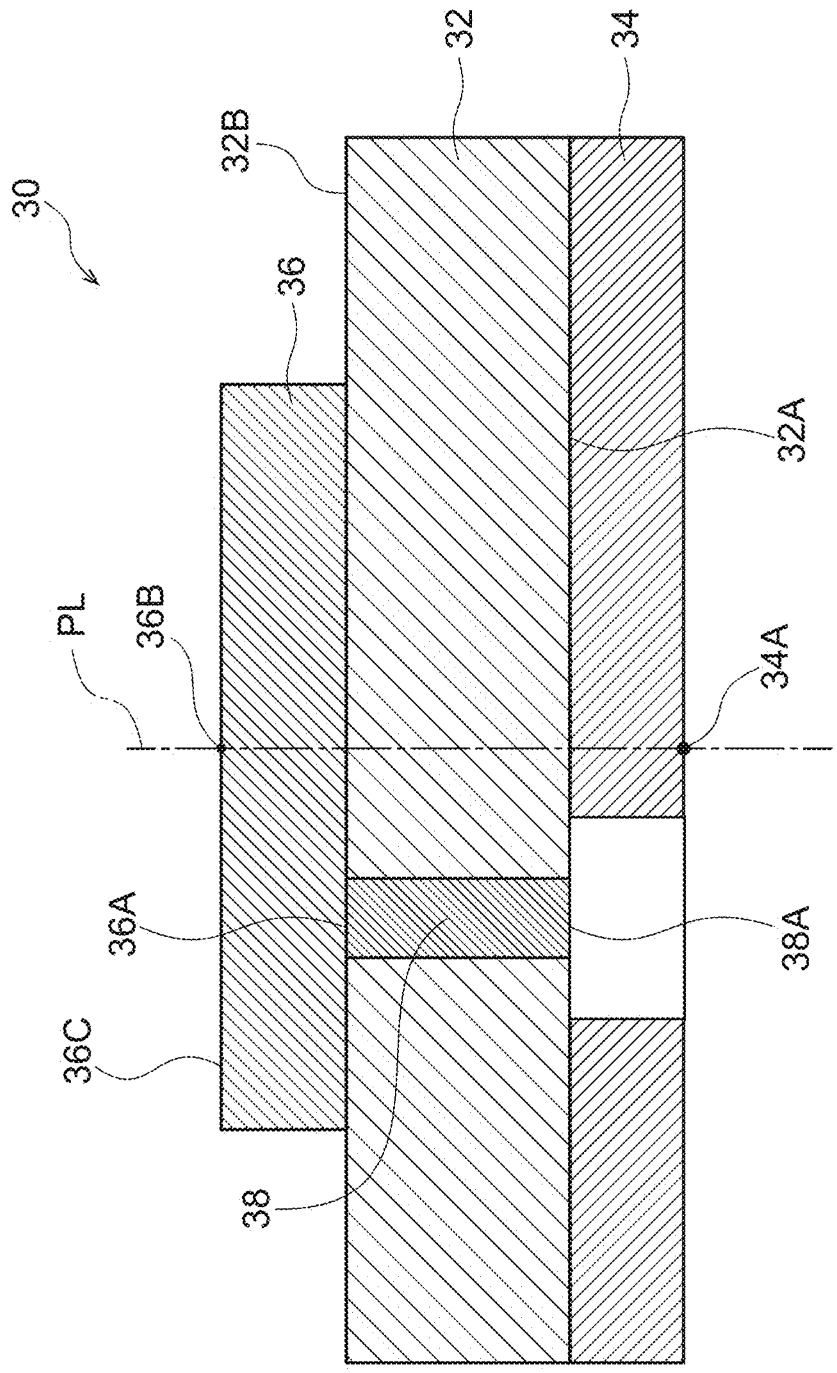
FIG. 5 is a cross-section illustrating an antenna according to a first exemplary embodiment, illustrated in a cross-section taken along B-B of FIG. 4.

FIG. 4 is a perspective view of the antenna 30, and FIG. 5 is a cross-section taken along cross-section B-B of FIG. 4. As illustrated in FIG. 5, the antenna 30 includes a dielectric substrate 32, a ground conductor plate 34, a radiation plate (radiation conductor) 36, a feed portion 38A, and a connection conductor 38.

Dielectric Substrate 32

The dielectric substrate 32 is a plate shaped or film shaped dielectric layer having a dielectric as a main component thereof. Note that reference to "plate shaped or film shaped" may include a three-dimensional shape and, for example, may include a protruding shape, an indented shape, or a wavy shape. The ground conductor plate 34 and the radiation plate 36 may also be similarly "plate shaped or film shaped". However, the ground conductor plate 34 and the radiation plate 36 are preferably planar shaped (two dimensional shaped). The characteristics of antenna gain of the antenna 30 are easier to predict when these members are planar shaped.

As is apparent from FIG. 4 and FIG. 5, the dielectric substrate 32 is a cuboidal body, and the front view profile thereof is a rectangular shape having a larger Y axis direction dimension than X axis direction dimension, however the dielectric substrate 32 may be a square shape in which the Y axis direction dimension and X axis direction dimension are equal, and may be a freely selected shape including a polygonal shape, a circular shape, or a curved shape. As illustrated in FIG. 5, the dielectric substrate 32 includes a surface 32A that is one thickness direction face thereof, and a surface 32B that is the other face thereof. The surface 32A and the surface 32B are planar surfaces parallel to each other. The dielectric substrate 32 may, for example be configured from a glass epoxy board or the like, and may be configured from a dielectric sheet. The material of the dielectric contained in the dielectric substrate 32 may, for example, be a glass such as quartz glass, a ceramic, a fluororesin such as polytetrafluoroethylene, a liquid crystal polymer, or a cycloolefin polymer. However, the material of the dielectric may be a different material from these. Furthermore, the antenna 30 may be laminated by combining the dielectric substrate 32 and the radiation plate 36 in the thickness direction thereof. In such cases, for example, the size of the radiation plate 36 may be adjusted such that the antenna 30 functions as a GNSS antenna corresponding to a frequency band of both a 1.2 GHz band and a 1.6 GHz band.

Ground Conductor Plate 34

A ground conductor plate 34 is provided to the surface 32A of the dielectric substrate 32, so as to function as a ground of the antenna 30. The ground conductor plate 34 is a plate shaped or film shaped conductor. Both thickness direction faces of the ground conductor plate 34 are flat planes parallel to each other. Examples of the material configuring the ground conductor plate 34 include, for example, copper and silver, however there is no limitation to these materials. A front view profile of the illustrated ground conductor plate 34 is a square shape of the same size as the dielectric substrate 32. However, the front view profile of the ground conductor plate 34 may be a shape other than a square shape. For example, the front view profile of the ground conductor plate 34 may be a rectangular shape, a polygonal shape, or a circular shape.

Radiation Plate 36

The radiation plate 36 is provided to the surface 32B of the dielectric substrate 32. The radiation plate 36 is a plate shaped or film shaped conductor, and has a smaller surface area than the ground conductor plate 34. The radiation plate 36 is a plate shaped layer, and the radiation face 36C, which is the face on the opposite side to the dielectric substrate 32 side, is a flat plane. The radiation plate 36 functions as a radiation element of the antenna 30. Examples of the material configuring the radiation plate 36 include, for example, copper and silver, however there is no limitation to these materials. The front view profile of the illustrated radiation plate 36 is a substantially square shape, and includes cut outs at a pair of opposing corners. Including the cut outs means that the radiation plate 36 is configured so as to be able to receive signals of circular polarized waves. The cut outs correspond to known degeneracy separation elements and perturbation segments, and the surface area of parts removed from a square without cut outs can be set to a surface area determined by a degeneracy separation method. The antenna 30 may also be configured with feed portions provided at two points to transmit and receive circular polarized wave signals using a substantially square shaped radiation plate that lacks such cut outs at a pair of opposing corners.

Feed Portion 38A

The feed portion 38A is a location where electricity is fed either by a contact or a non-contact method, and is a location where one end of a non-illustrated feed line is either connected or is in the vicinity. Specific examples that can be given of the feed line include a coaxial cable, a strip line, a microstrip line, a coplanar feed line, and the like. The other end of the feed line is connected to a communication device (electronic control unit (ECU)) for controlling the signal of the antenna 30.

Connection Conductor 38

The connection conductor 38 is provided inside a through hole piercing through the dielectric substrate 32 in the plate thickness direction thereof. The connection conductor 38 is, for example, a core line of a coaxial cable or a conductor pin, however there is no limitation thereto. One end of the connection conductor 38 is connected to the feed portion 38A, and the other end of the connection conductor 38 is connected to a connection point 36A of the radiation plate 36. Note that the connection conductor 38 does not contact the ground conductor plate 34.

As illustrated in FIG. 4, in front view (viewed along the plate thickness direction of the dielectric substrate 32), the connection point 36A is separated from a centroid 36B of the radiation plate 36. Note that the connection conductor 38 may, for example, be a core line of a coaxial cable or a conductor pin for cases in which a medium between the ground conductor plate 34 and the radiation plate 36 is space (air), however there is no limitation to the connection conductor 38 of such cases. As illustrated in FIG. 5, the centroid 36B of the radiation plate 36 and a centroid 34A of the ground conductor plate 34 are positioned on a straight line PL that passes through the radiation plate 36 in the thickness direction thereof.

Radio Wave Transmitting and Receiving Region 30A

The radio wave transmitting and receiving region 30A is a region where the antenna 30 performs at least one of transmission or reception of radio waves. As illustrated in FIG. 2, the radio wave transmitting and receiving region 30A is a region surrounded by the EBG structure 20 when viewed along the thickness direction of the roof glass 14, and is formed in a rectangular shape. As illustrated in FIG. 3, the radio wave transmitting and receiving region 30A is formed so as to be wider than a region of an external shape of the radiation face 36C vertically projected onto the roof glass 14.

EBG Structure 20

As illustrated in FIG. 2 and FIG. 3, the EBG structure 20 is attached to the second main face 14A of the roof glass 14 by, for example, an adhesive or the like. The EBG structure 20 is formed in a rectangular frame shape having a predetermined conductor pattern (unit cell) periodically disposed thereon so as to surround the radio wave transmitting and receiving region 30A. The conductor configuring the EBG structure 20 may employ a metal such as copper, silver, or the like, however there is no limitation thereto, and the visibility is improved when a transparent conductor is employed therefor. Furthermore, even when a conductor for configuring the EBG structure 20 is an opaque conductor, the visibility can still be raised by using a conductor processed into a mesh form.

As illustrated in FIG. 2, when viewed along the plate thickness direction of the roof glass 14, the EBG structure 20 is disposed further toward a front side than a vehicle front-rear direction center of the roof glass 14, and further toward a left side than a vehicle width direction center. In other words, the EBG structure 20 is disposed in the vicinity of an internal corner between the first metal frame-piece 12A and the third metal frame-piece 12C. Namely, the EBG structure 20 is disposed in the vicinity of a corner portion of the roof glass 14, however the placement of the EBG structure 20 is not limited to being in the vicinity of a corner.

The EBG structure 20 disposed between the antenna 30 and the metal frame 12 is duplex that includes a first EBG structure 20A and a second EBG structure 20B arranged alongside each other an outer periphery of the first EBG structure 20A. Note that the EBG structure 20 may be formed as a simplex, or may be formed as a triplex or higher order structure. The EBG structure 20 may be configured from a transparent or a semi-transparent material. However, in cases in which the EBG structure 20 is configured from an opaque material, there is a concern regarding a fall in visibility as the number of unit cells increases. Moreover, the workload increases as the number of the unit cells increases, and there is a concern regarding a fall in the productivity (yield).

Moreover, the roof glass 14 may include a (non-illustrated) light blocking film at a peripheral edge portion or the like thereof. A light blocking film is an opaque color ceramic layer with a thickness of from about 5 μm to about 25 μm in a freely selected color, however is preferably a dark color such as a black, brown, grey, dark blue, or the like, or white, and is more preferably black. Visibility is improved if the light blocking film overlaps part of or all of the EBG structure 20 when viewed along the plate thickness direction of the roof glass 14. Furthermore, although the visibility is improved when the light blocking film overlaps all of the EBG structure 20, the surface area of an opening (transmittance region) of the roof glass 14 is smaller, and so may be adjusted as appropriate. Note that other than the roof glass 14, the light blocking film may also be provided at peripheral edge portions of glass plates, such as the windshield 16, the rear glass 18, or the like of the exemplary embodiment as described later, and the visibility is similarly improved thereby.

Figure 6:
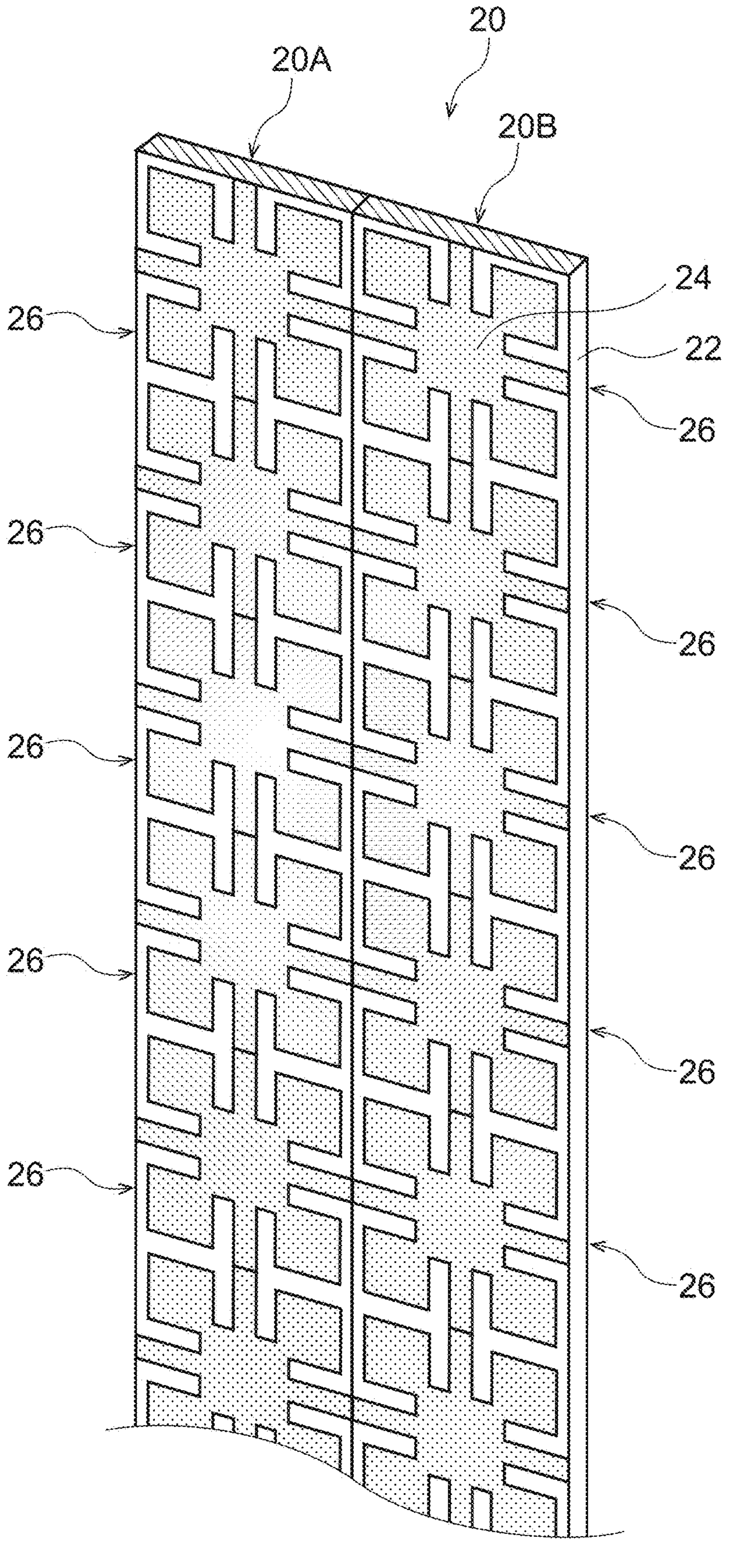
FIG. 6 is a perspective view illustrating part of an EBG structure according to the first exemplary embodiment.
Figure 7:
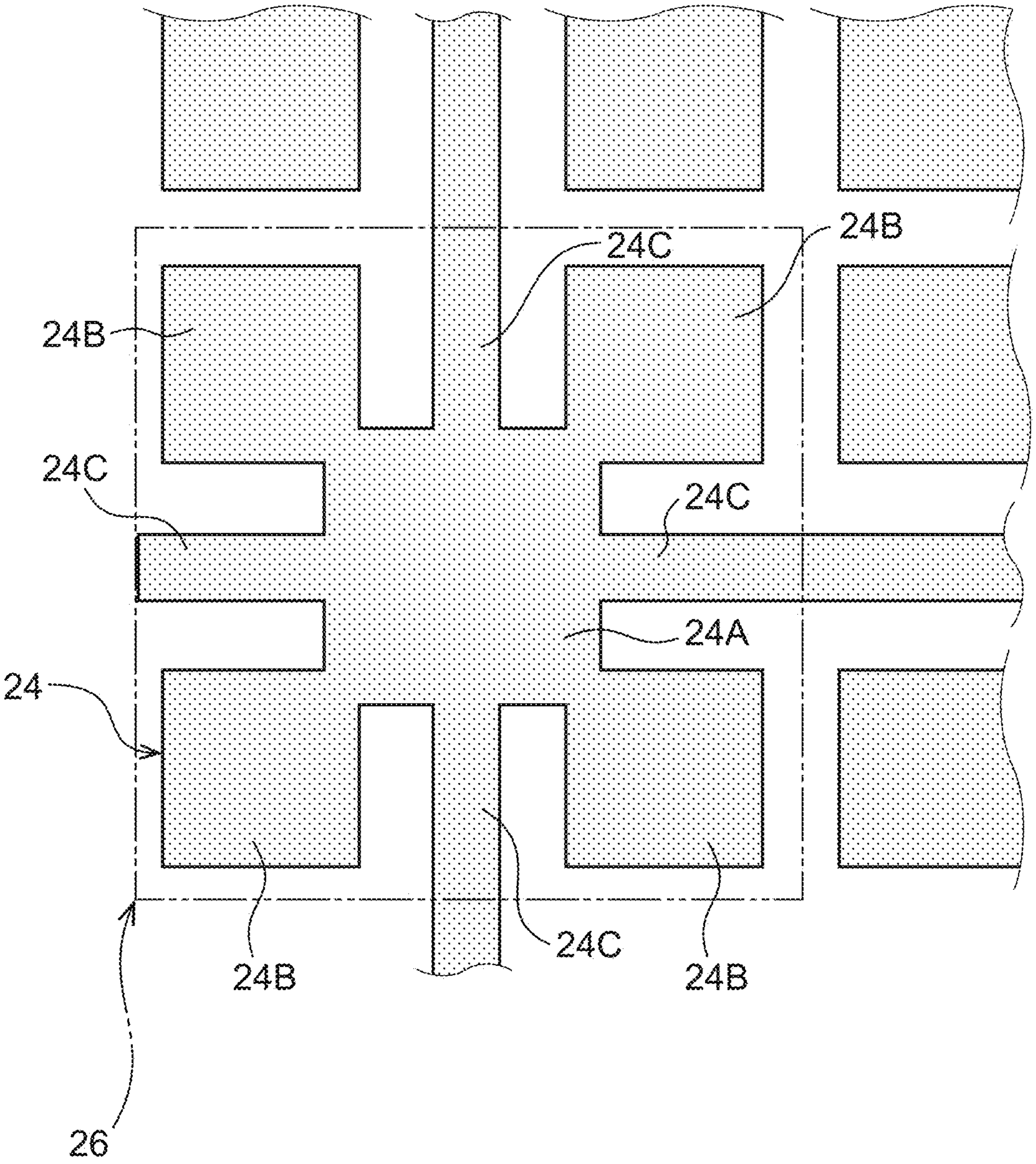
FIG. 7 is a plan view illustrating an enlargement of part of an EBG structure according to the first exemplary embodiment.

FIG. 6 is a perspective view illustrating part of the EBG structure 20, and FIG. 7 is an enlarged plan view illustrating part of the EBG structure 20. As illustrated in FIG. 6, a substrate 22 and a conductor portion 24 are formed in thin plate shaped planer shapes on the first EBG structure 20A and on the second EBG structure 20B. A predetermined conductor pattern 26, which is the unit pattern formed by the conductor portion 24, is periodically arranged along the first EBG structure 20A and the second EBG structure 20B. The conductor pattern 26 is set so as to suppress propagation of radio waves in a predetermined frequency band transmitted and received by the antenna 30 (for example, a 1.6 GHz band).

As illustrated in FIG. 7, the conductor portion 24 for a single conductor pattern 26 includes a main patch 24A, sub patches 24B, and bridge portions 24C.

The main patch 24A is formed in a rectangular plate shape, and is disposed at substantially the center of each of the conductor pattern 26. The sub patches 24B are each formed in a rectangular plate shape, and four thereof are disposed at a periphery of the main patch 24A such that a portion of each is connected to the main patch 24A.

The bridge portions 24C are formed in a rectangular plate shape, and four thereof are provided so as to extend in a radial shape from the main patch 24A. The bridge portions 24C are each formed so as to connect between the main patches 24A of adjacent of the conductor patterns 26. Note that the conductor pattern 26 is not limited to the shape illustrated in FIG. 6, and may be appropriately adjusted to match corresponding frequency bands.

In the example of the vehicle antenna device 4A illustrated in FIG. 2, when viewed along the plate thickness direction of the roof glass 14, a shortest distance D1 between an outer edge on the vehicle front side of the EBG structure 20 and a front end side 15A on the vehicle front side of the roof glass 14, is set so as to be shorter than a shortest distance D3 between an outer edge on the vehicle left side of the EBG structure 20 and a left end side 15C on the vehicle left side of the roof glass 14. Moreover, when viewed along the plate thickness direction of the roof glass 14, the shortest distance D3 is set so as to be shorter than a shortest distance D2 between the outer edge on the vehicle rear side of the EBG structure 20 and a rear end side 15B on the vehicle rear side of the roof glass 14. Furthermore, when viewed along the plate thickness direction of the roof glass 14, the shortest distance D2 is set so as to be shorter than a shortest distance D4 between an outer edge on the vehicle right side of the EBG structure 20 and a right end edge 15D on the vehicle right side of the roof glass 14. In the following the shortest distance D1 to shortest distance D4 are referred to simply as D1 to D4.

Namely, D1, D2, D3, and D4 are set to different distances to each other. In other words, in the example of the vehicle antenna device 4A illustrated in FIG. 2, a shortest distance between a first side forming an outer edge of the roof glass 14 and an outer edge of the EBG structure 20, is formed so as to be different from the shortest distance between another second side forming an outer edge of the roof glass 14 and an outer edge of the EBG structure 20. Note that D1 and D3 may be the same distance, and D1, D2, D3, and D4 can be set to match a freely selected position where the antenna 30 is disposed.

In the example of the vehicle antenna device 4A illustrated in FIG. 2, as viewed along the plate thickness direction of the roof glass 14, D2 and D4 are formed longer than a longest distance L from a centroid P1 of the radio wave transmitting and receiving region 30A to the outer edge of the radio wave transmitting and receiving region 30A. In other words, D2 and D4 are formed longer than a distance from the centroid P1 of the radio wave transmitting and receiving region 30A to a corner of the radio wave transmitting and receiving region 30A. Note that at least one from out of the D1, D2, D3, or D4 may be formed longer than the longest distance L from the centroid P1 of the radio wave transmitting and receiving region 30A to the outer edge of the radio wave transmitting and receiving region 30A.

In this manner, in the example of the vehicle antenna device 4A illustrated in FIG. 2, the centroid P1 of the radio wave transmitting and receiving region is formed at a different position from a centroid P2 of the roof glass 14.

Moreover, the EBG structure 20 is formed separated by a distance G from the antenna 30 when viewed along the plate thickness direction of the roof glass 14. In other words, when viewed along the plate thickness direction of the roof glass 14, the antenna 30 is formed in a rectangular loop shape that surrounds the EBG structure 20 while being separated at a uniform distance G therefrom. Namely, such a rectangular loop corresponds to a region where there is no conductor provided and only a dielectric (glass plate). Note that the antenna 30 may be surrounded by an EBG structure 20 that is separated by different distances in the vehicle front-rear direction and in the vehicle width direction.

Electric Field Distribution Analysis and Directionality Analysis

Description follows regarding electric field distribution analysis and directionality analysis performed to confirm advantageous effects of the EBG structure-attached glass plate 4 and the vehicle antenna device 4A of the first exemplary embodiment.

Analysis 1

Figure 8A:
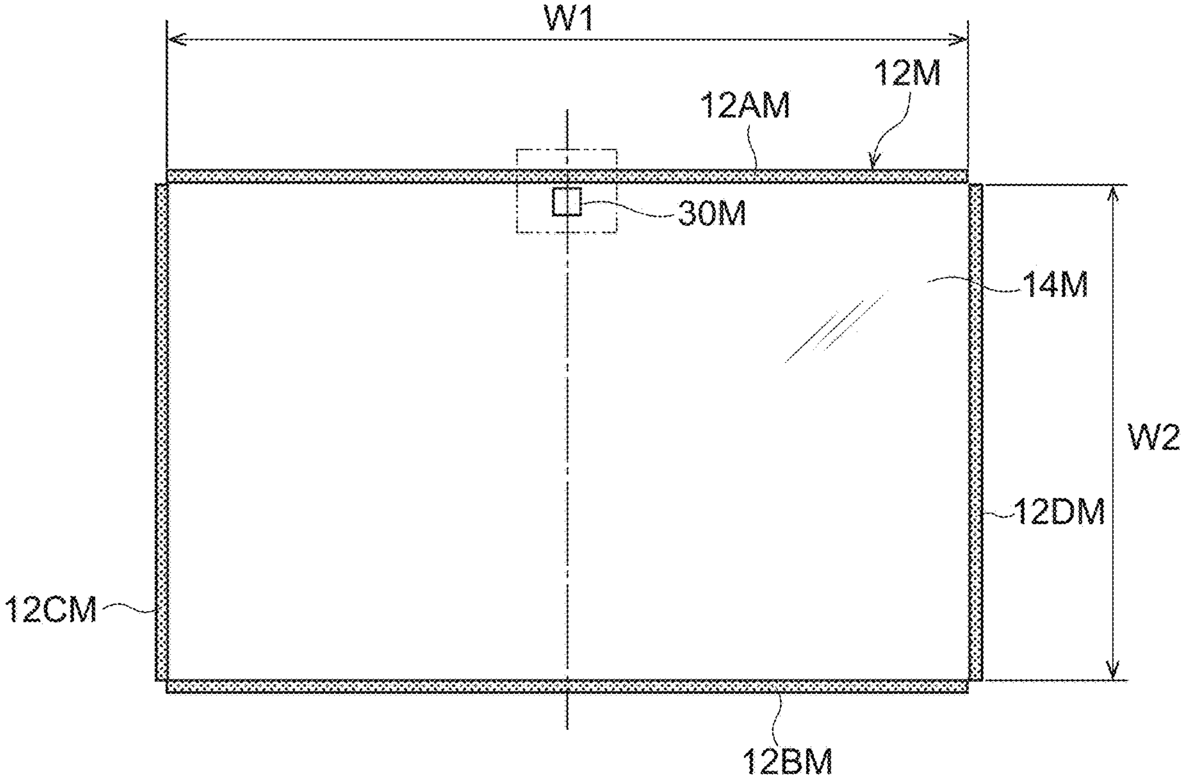
FIG. 8A is an analysis model chart of an analysis model serving as a comparative example with an antenna disposed on a roof glass attached to a metal frame, and is a plan view looking along the plate thickness direction of the roof glass.
Figure 8B:
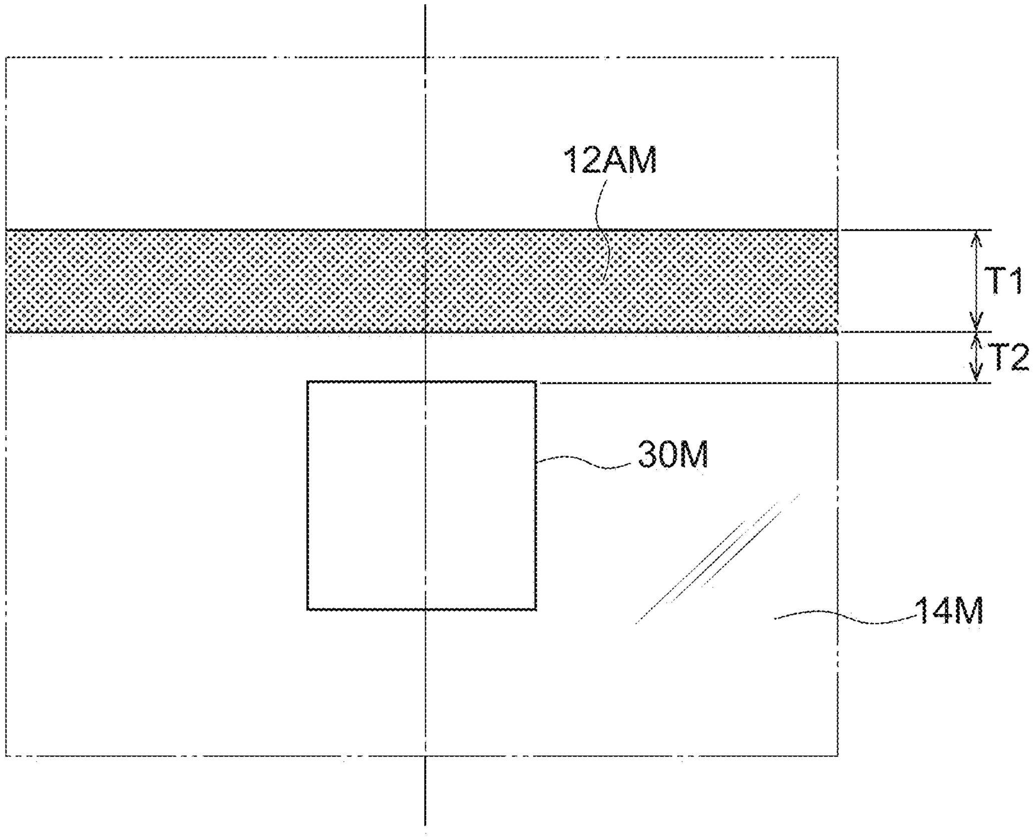
FIG. 8B is an analysis model chart of an analysis model serving as a comparative example with an antenna disposed on a roof glass attached to a metal frame, and is an enlarged plan view of an enlargement in the vicinity of the antenna.

FIG. 8A and FIG. 8B are drawings illustrating an analysis model in which the vehicle antenna device 4A is employed as a comparative example. As illustrated in FIG. 8A and FIG. 8B, in Analysis 1 a vehicle antenna device model of an Example 1 is generated as a comparative example. The Example 1 vehicle antenna device model includes a metal frame model 12M serving as an analysis model of the metal frame 12, a roof glass model 14M serving as an analysis model of the roof glass 14, and an antenna model 30M serving as an analysis model of the antenna 30.

In FIG. 8A, the roof glass model 14M has a rectangular shape with a vehicle width direction width W1 of 800 mm, and a vehicle front-rear direction length W2 of 500 mm. The metal frame 12 is provided so as to surround an outer edge of the roof glass model 14M. Moreover, in FIG. 8B, a width T1 in the short direction of the metal frame 12 is 10 mm.

The antenna model 30M is set with a square shape of 30 mm×30 mm in front view. A distance T2 between the antenna model 30M (end portion of the ground conductor plate 34 in FIG. 3) and the first metal frame-piece model 12AM is set to 5 mm. Furthermore, the antenna model 30M is disposed at a vehicle width direction center of the roof glass model 14M.

Directionality analysis was performed on the Example 1 vehicle antenna device model generated as described above for vertical plane dextrorotatory polarized waves having a frequency of 1.5754 GHz.

Figure 9:
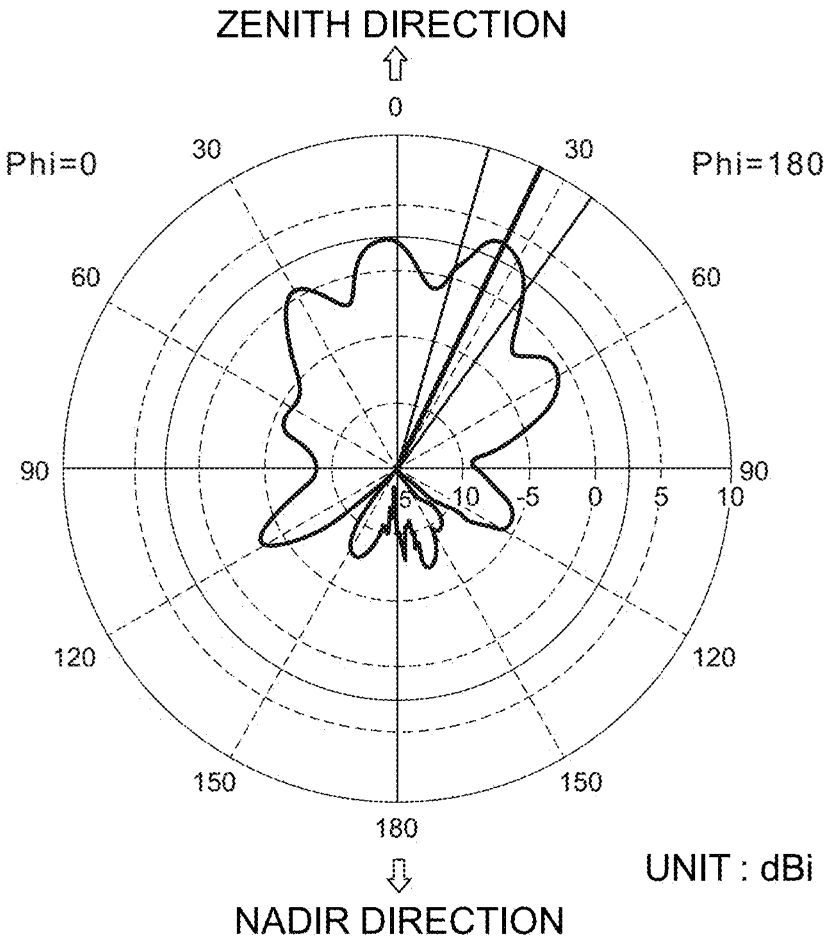
FIG. 9 is an analysis chart illustrating directionality characteristics of the analysis model illustrated in FIG. 8A.

FIG. 9 illustrates analysis results in "Analysis 1" for antenna gain and directionality of the antenna model 30M as viewed along a horizontal direction of the vehicle. As is apparent from FIG. 9, the following analysis results were obtained.

Size of main lobe: 3.7 dBi

Direction of main lobe: 25.0 degrees 3 dB half-power beam width: 19.8 degrees

Side lobe level: −0.9 (dB)

Moreover, it is apparent from FIG. 9 that in "Analysis 1", a ripple was generated in the antenna gain, and the antenna gain dropped in the zenith direction.

Analysis 2

Figure 10:
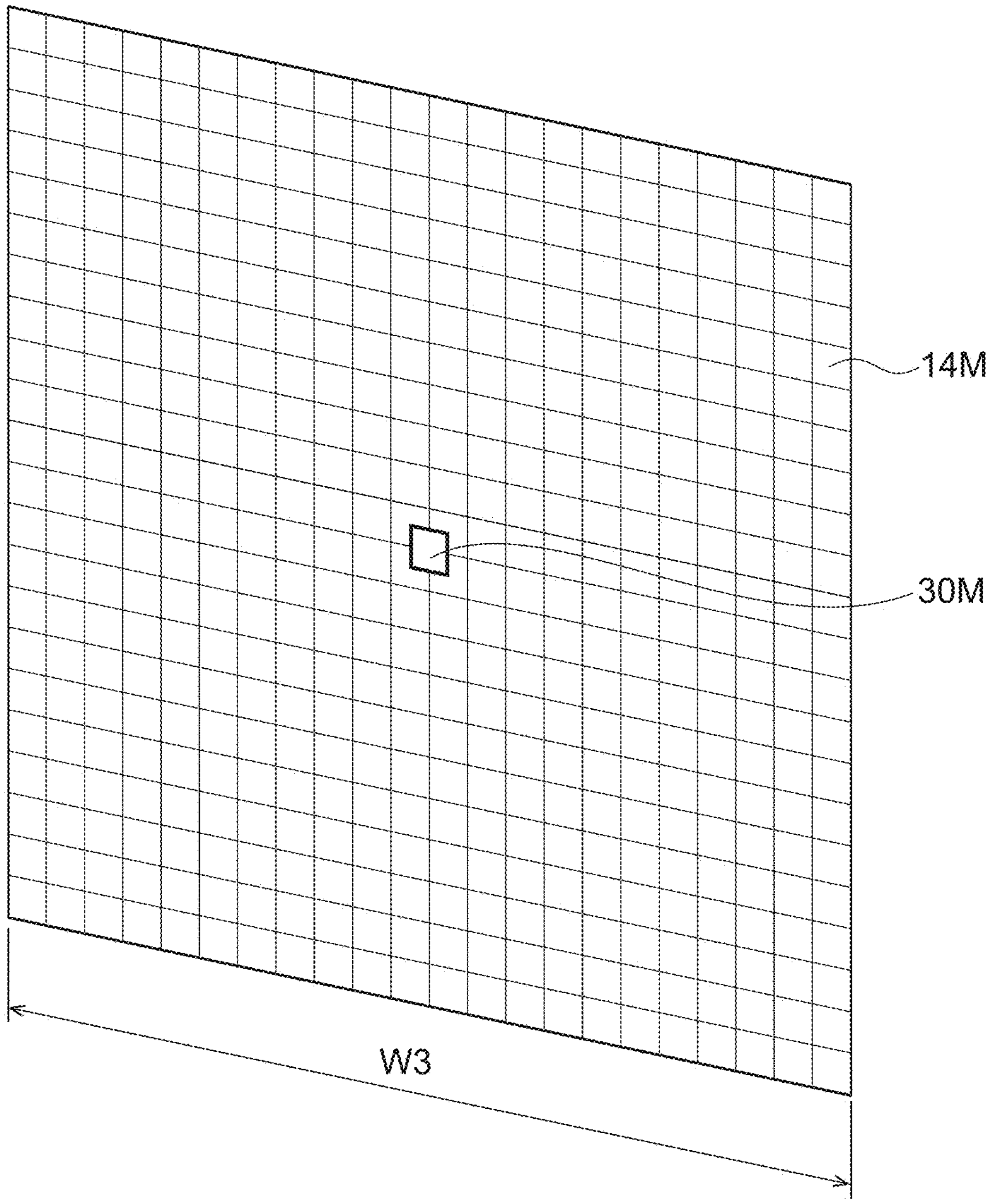
FIG. 10 is an analysis model chart illustrating an analysis model of an antenna disposed on the glass plate.

FIG. 10 is an analysis model chart for an antenna disposed on a glass plate lacking a metal frame. As illustrated in FIG. 10, in the Analysis 2 a vehicle antenna device model of an Example 2 was generated as an ideal reference example. The Example 2 vehicle antenna device model includes a roof glass model 14M serving as an analysis model of the roof glass 14, and an antenna model 30M serving as an analysis model of the antenna 30.

The antenna model 30M is disposed at a vehicle width direction center and a vehicle front-rear direction center of the roof glass model 14M. The roof glass model 14M was a rectangle shape having a vehicle width direction width W3 of 807.4 mm.

Figure 11A:
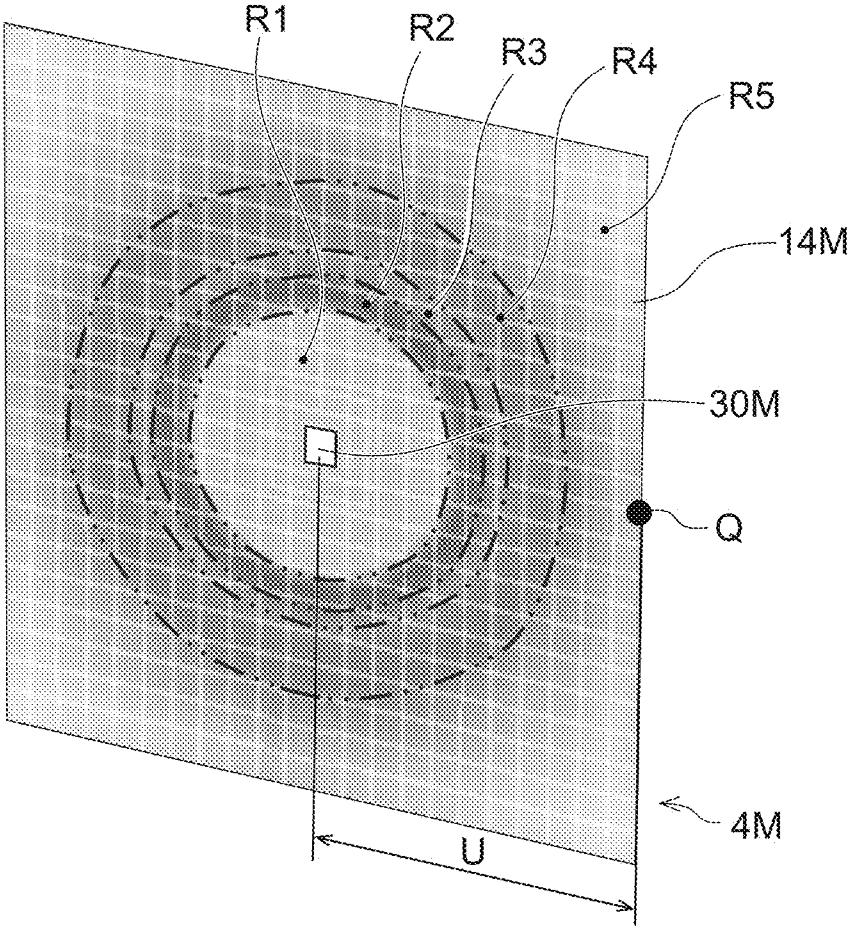
FIG. 11A is an analysis chart illustrating analysis results of the analysis model illustrated in FIG. 10, and illustrates an electric field distribution.
Figure 11B:
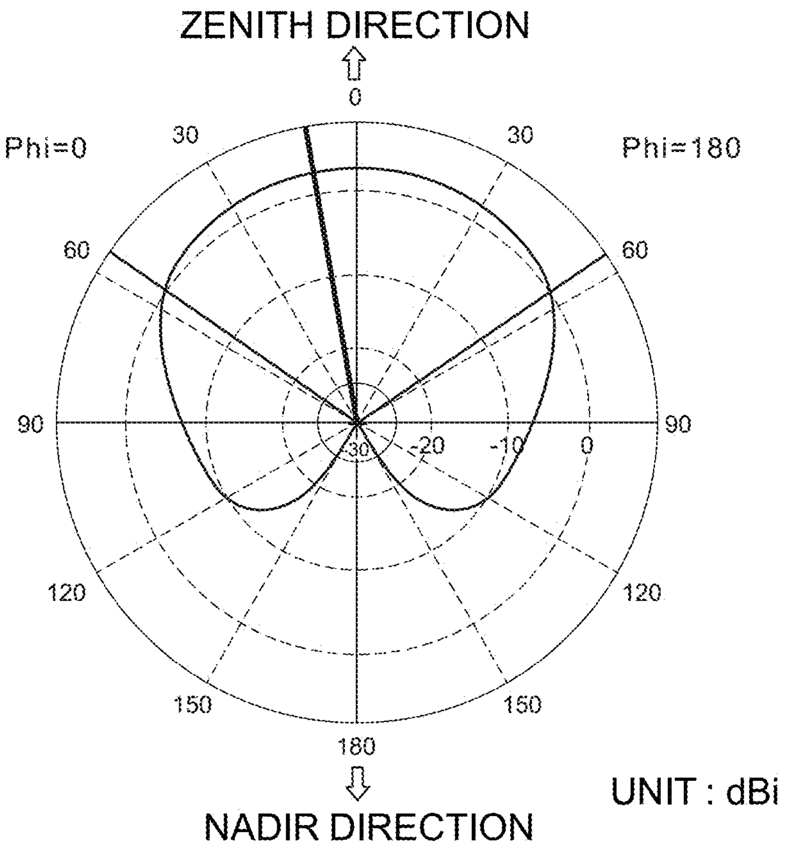
FIG. 11B is an analysis chart illustrating analysis results of the analysis model illustrated in FIG. 10, and illustrates directionality characteristics.

Electric field distribution analysis was performed for the Example 2 vehicle antenna device model generated as described above. FIG. 11A is an electric field distribution chart in "Analysis 2" along a glass plane of the antenna model 30M. FIG. 11B is analysis results in the "Analysis 2" indicating antenna gain and directionality of the antenna model 30M when viewed along a vehicle horizontal direction.

It is apparent from FIG. 11A that substantially concentric circular shapes centered on the antenna model 30M are formed by the external shape of a first region R1 that is a region where the electric field strength is strongest, by the external shape of a second region R2 that is formed at the outside of the first region and is a region where the electric field strength is weaker than the first region R1, by the external shape of a third region R3 that is a region formed at the outside of the second region and is a region where the electric field strength is weaker than the second region R2, and by the external shape of a fourth region R4 that is a region formed at the outside of the third region R3 and is a region where the electric field strength is weaker than the third region R3. Note that there is a fifth region R5 formed at the outside of the fourth region where the electric field strength is weaker than the fourth region R4.

Moreover, the electric field strength was 2.3 V/m at a measurement point Q separated from the antenna model 30M by a distance U in the vehicle width direction.

Moreover, directionality analysis was performed on the Example 2 vehicle antenna device model generated as described above for vertical plane dextrorotatory polarized waves having a frequency of 1.57542 GHz.

As is apparent from FIG. 11B, analysis results such as the following were obtained.

Size of main lobe: 3.6 dBi

Direction of main lobe: 10.0 degrees 3 dB half-power beam width: 112.0 degrees

Side lobe level: −28.5 (dB)

Moreover, it is apparent from FIG. 11B that in "Analysis 2" no ripple in the antenna gain was generated, and stable directionality was obtained.

From this it is apparent that in "Analysis 2" the directionality in the zenith direction was improved compared to the "Analysis 1" generated with the metal frame model 12M. Namely, it is apparent that the beam (antenna gain) is distorted in the vehicle antenna device model including only the metal frame 12 and the antenna 30, and there is a drop in the directionality in the zenith direction.

Analysis 3

Figure 12:
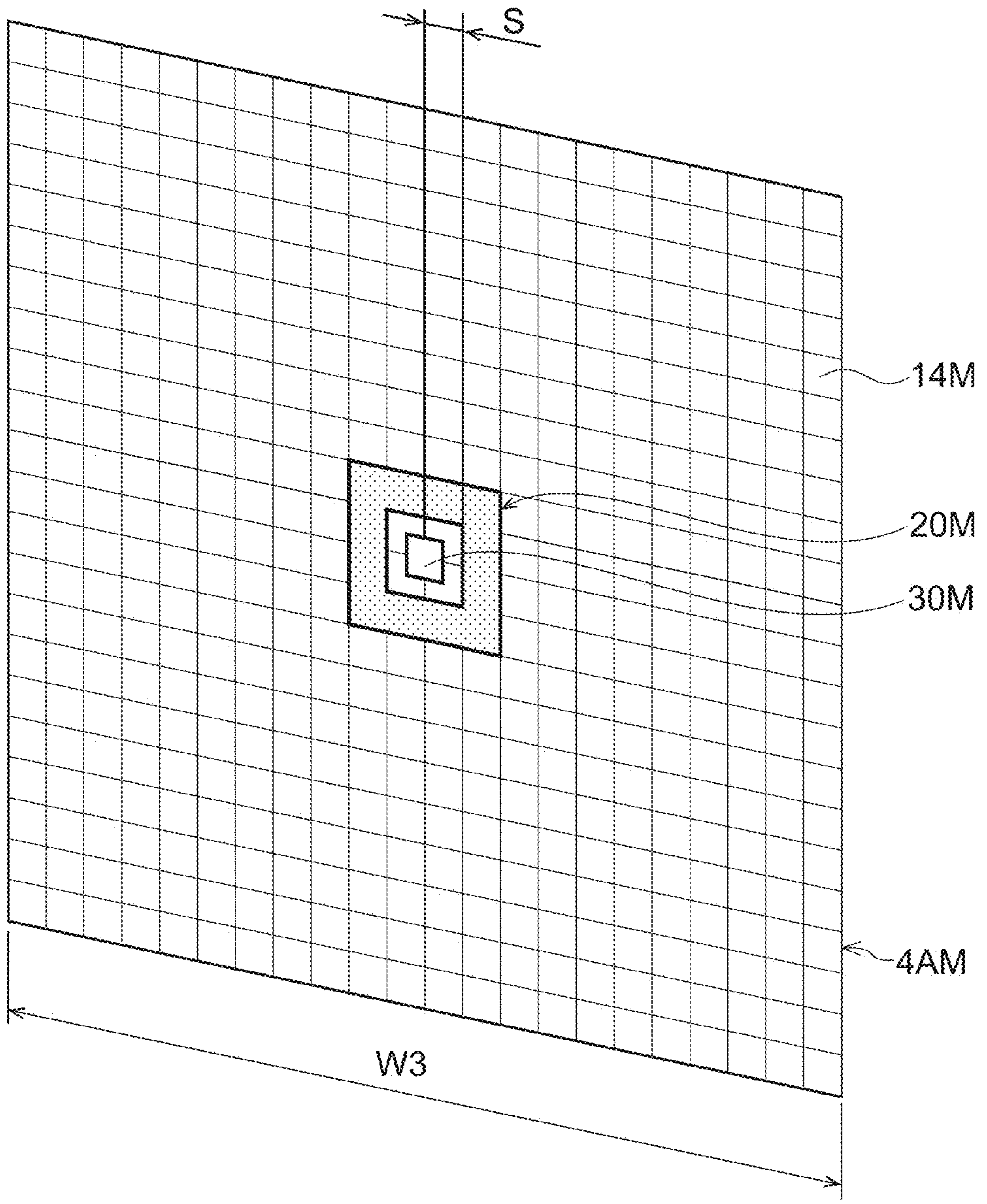
FIG. 12 is an analysis model chart illustrating an analysis model in which an antenna and a simplex EBG structure have been disposed on a glass plate.

FIG. 12 is an analysis model chart in which an antenna has been disposed on a glass plate lacking a metal frame. As illustrated in FIG. 12, in "Analysis 3" a vehicle antenna device model 4AM of an Example 3 was produced, serving as a working example of the first exemplary embodiment. The Example 3 vehicle antenna device model 4AM included a roof glass model 14M serving as an analysis model of the roof glass 14, an antenna model 30M serving as an analysis model of the antenna 30, and a simplex EBG structure model 20M serving as an analysis model of the EBG structure 20.

The antenna model 30M was disposed at the vehicle width direction center and the vehicle front-rear direction center of the roof glass model 14M. The roof glass model 14M had a rectangular shape with a vehicle width direction width W3 of 807.4 mm. A distance S from a center of the antenna model 30M to an inner edge of the EBG structure model 20M was 36.7 mm.

Figure 13A:
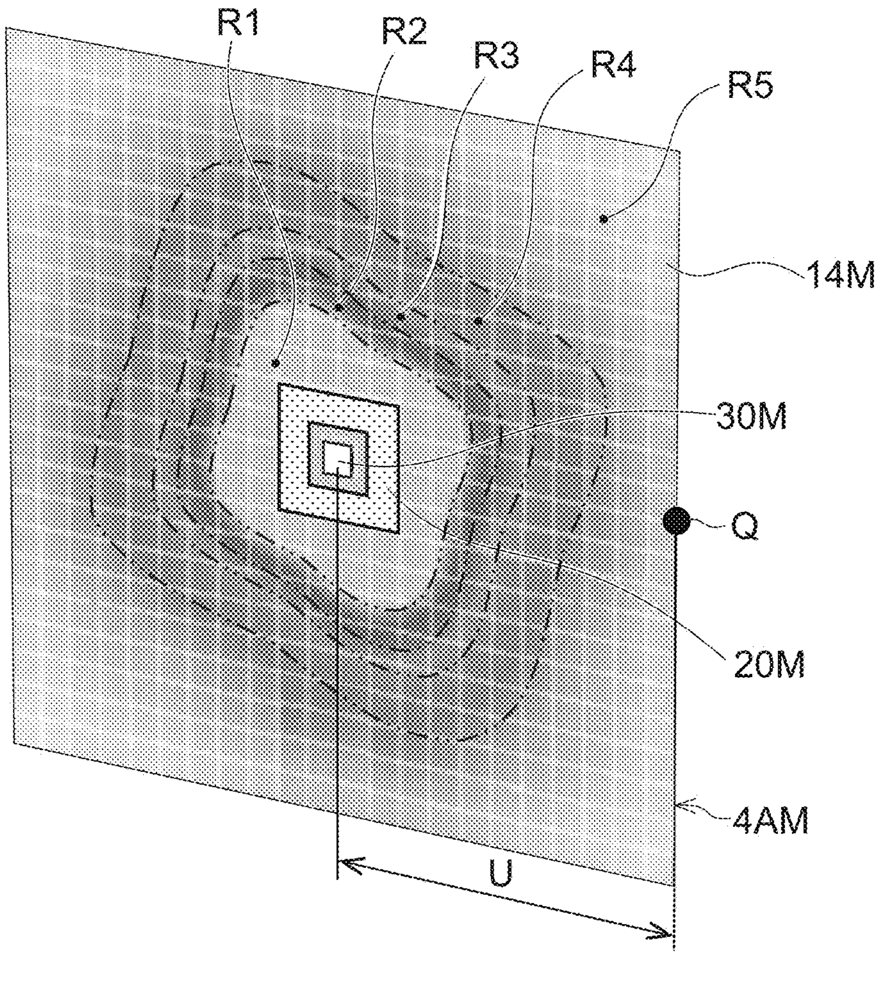
FIG. 13A is an analysis chart illustrating analysis results of the analysis model illustrated in FIG. 12, and illustrates an electric field distribution.
Figure 13B:
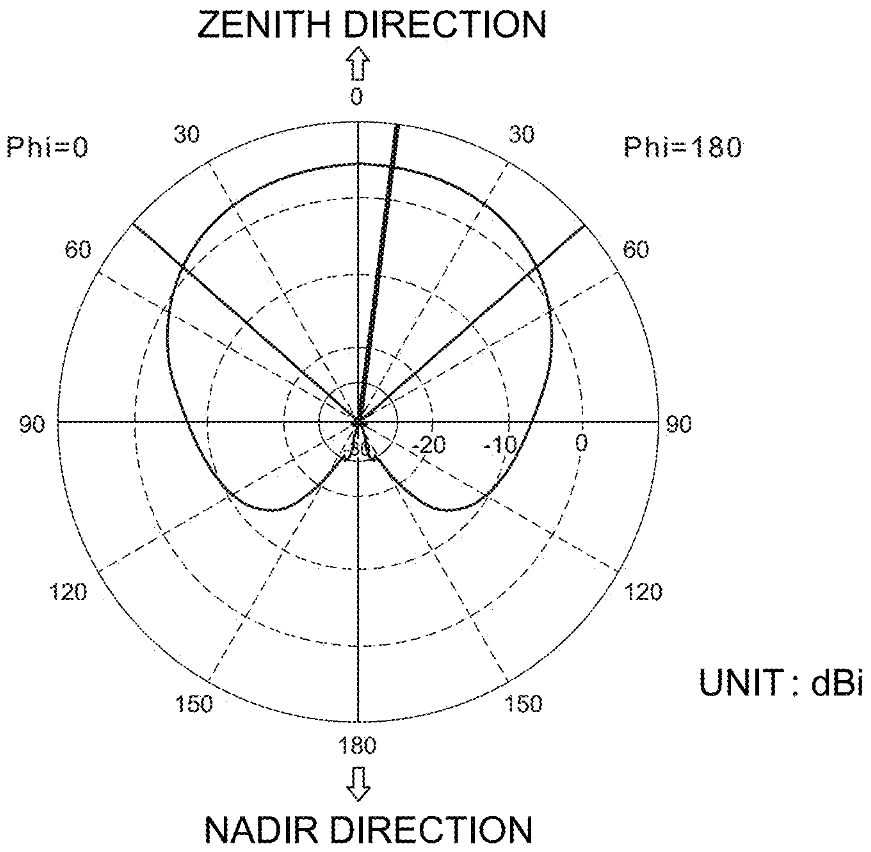
FIG. 13B is an analysis chart illustrating analysis results of the analysis model illustrated in FIG. 12, and illustrates directionality characteristics.

An electric field distribution analysis was performed for the Example 3 vehicle antenna device model 4AM generated as described above. FIG. 13A is an electric field distribution chart in "Analysis 3" along a glass plane of the antenna model 30M. FIG. 13B is analysis results in "Analysis 3" indicating the antenna gain and directionality of the antenna model 30M when viewed along a vehicle horizontal direction.

It is apparent from FIG. 13A that a substantially rectangular shape smaller than Example 2 is formed by the external shape of a first region R1, by the external shape of a second region R2, by the external shape of a third region R3, and by the external shape of a fourth region R4. Moreover, electric field strength was 2.1 V/m at a measurement point Q separated from the antenna model 30M by a distance U in the vehicle width direction.

From this it is apparent that surface waves propagating in the roof glass 14 were suppressed by disposing the EBG structure 20.

Moreover, directionality analysis was performed on the Example 3 vehicle antenna device model 4AM generated as described above for vertical plane dextrorotatory polarized waves having a frequency of 1.57542 GHz.

As is apparent from FIG. 13B, analysis results such as the following were obtained.

Size of main lobe: 4.43 dBi

Direction of main lobe: 7.0 degrees 3 dB half-power beam width: 97.2 degrees

Side lobe level: −29.0 (dB)

Moreover, it is apparent from FIG. 13B that in "Analysis 3" no ripple in the antenna gain was generated, and stable directionality was obtained. Furthermore, it is apparent that the main lobe was larger than in "Analysis 2".

From this it is apparent that the directionality in the zenith direction is improved by disposing the EBG structure 20. Note that although in "Analysis 3" for convenience a glass plate lacking a metal frame was employed as the model, similar results are obtained for a (roof glass) model including a metal frame such as in Example 1.

Analysis 4

Figure 14:
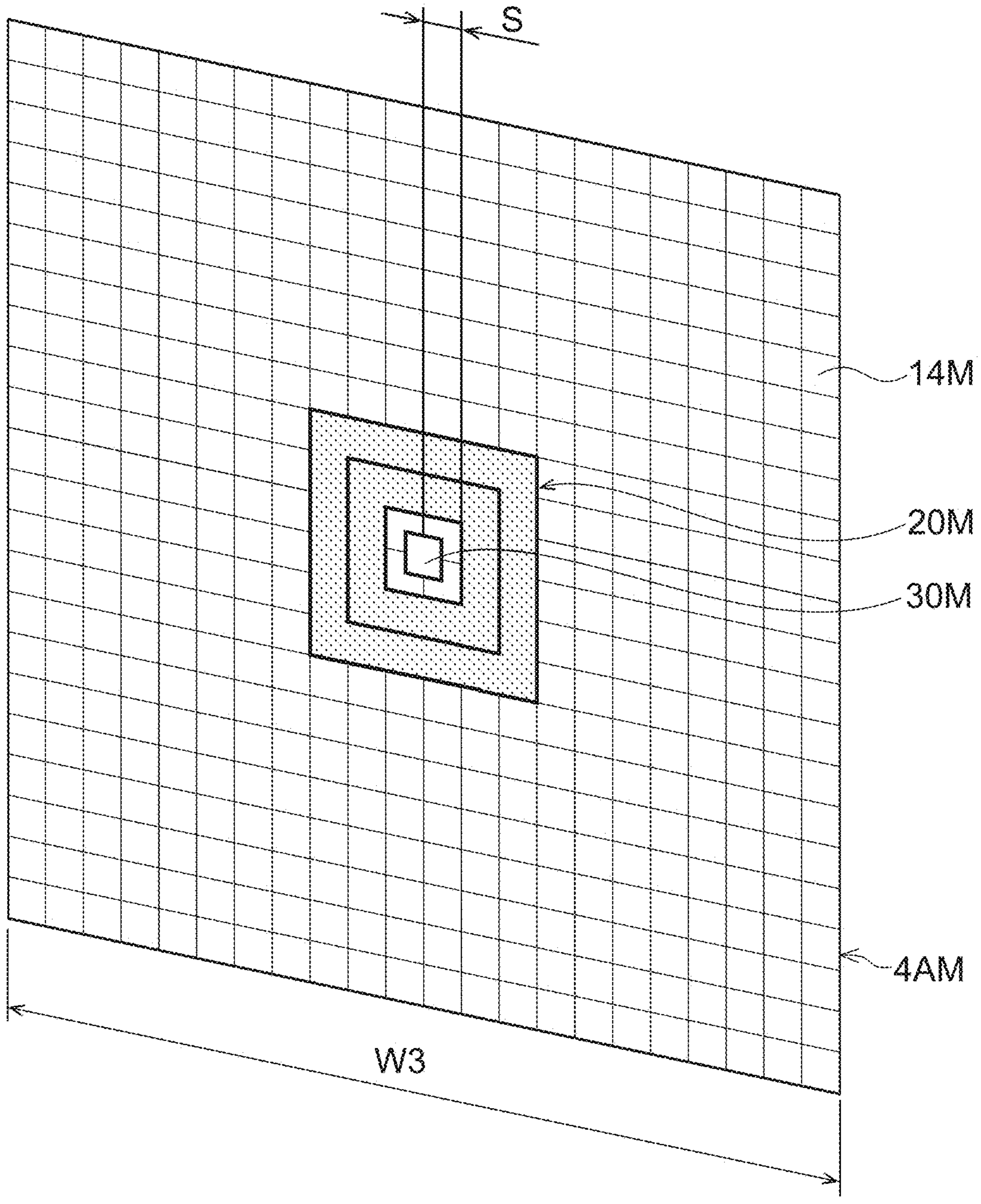
FIG. 14 is an analysis model chart illustrating an analysis model in which an antenna and a duplex EBG structure are disposed on a glass plate.

FIG. 14 is an analysis model chart for an antenna disposed on a glass plate lacking a metal frame. As illustrated in FIG. 14, in "Analysis 4" a vehicle antenna device model 4AM of an Example 4 was generated, serving as a working example of the first exemplary embodiment. The Example 4 vehicle antenna device model 4AM includes a roof glass model 14M serving as an analysis model of the roof glass 14, an antenna model 30M serving as an analysis model of the antenna 30, and a duplex EBG structure model 20M serving as an analysis model of the EBG structure 20.

The antenna model 30M was disposed at the vehicle width direction center and the vehicle front-rear direction center of the roof glass model 14M. The roof glass model 14M had a rectangular shape with a vehicle width direction width W3 of 807.4 mm. A distance S from a center of the antenna model 30M to an inner edge of the EBG structure model 20M was 36.7 mm.

Figure 15A:
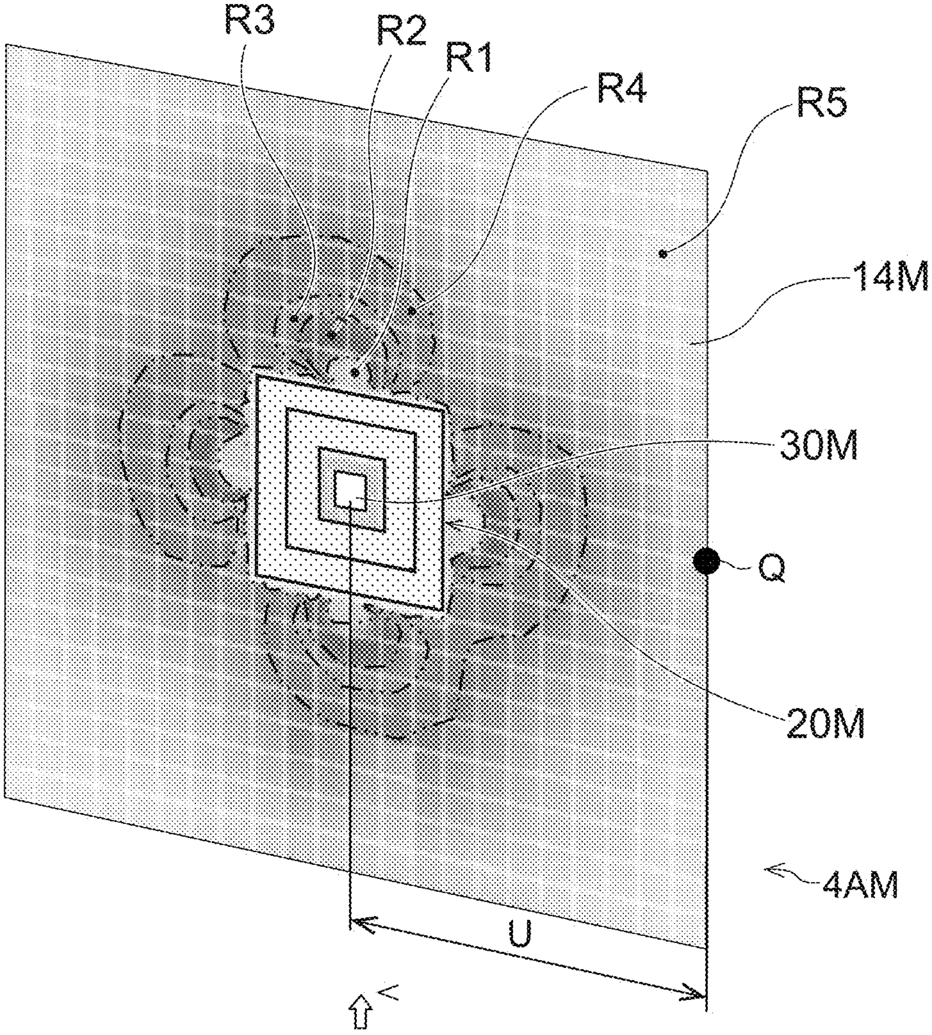
FIG. 15A is an analysis chart illustrating analysis results of the analysis model illustrated in FIG. 14, and illustrates an electric field distribution.
Figure 15B:
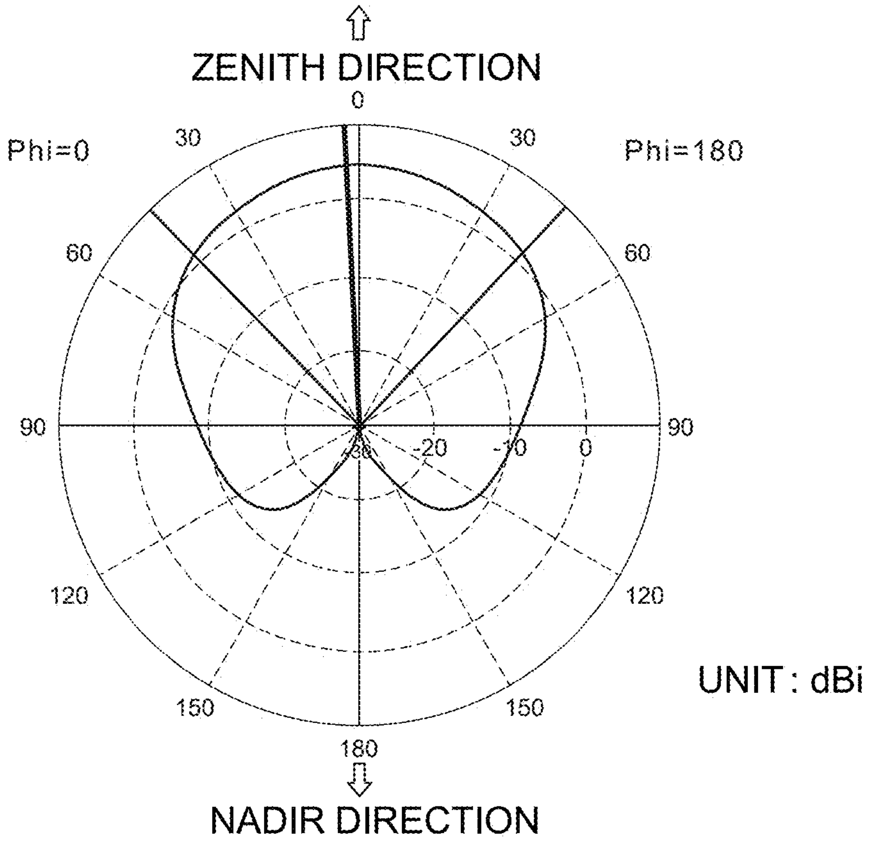
FIG. 15B is an analysis chart illustrating analysis results of the analysis model illustrated in FIG. 14, and illustrates directionality characteristics.

Field distribution analysis was performed for the Example 4 vehicle antenna device model 4AM generated as described above. FIG. 15A is an electric field distribution chart in "Analysis 4" along a glass plane of the antenna model 30M. Moreover, FIG. 15B is analysis results in "Analysis 4" indicating antenna gain and directionality of the antenna model 30M when viewed along a vehicle horizontal direction.

It is apparent from FIG. 15A that a four leafed clover shape smaller than in Example 3 is formed by the external shape of a first region R1, by the external shape of a second region R2, by the external shape of a third region R3, and by the external shape of a fourth region R4. Moreover, electric field strength at a measurement point Q separated from the antenna model 30M by a distance U in the vehicle width direction was 1.7 V/m.

It is apparent therefrom that surface waves propagating in the roof glass 14 are suppressed by disposing the duplex EBG structure 20.

Moreover, directionality analysis was performed on the Example 4 vehicle antenna device model 4AM generated as described above for vertical plane dextrorotatory polarized waves having a frequency of 1.57542 GHz.

As is apparent from FIG. 15B, analysis results such as the following were obtained.

Size of main lobe: 4.28 dBi

Direction of main lobe: 3.0 degrees 3 dB half-power beam width: 87.2 degrees

Moreover, it is apparent from FIG. 15B that in "Analysis 4" no ripple in the antenna gain was generated, and stable directionality was obtained. Furthermore, it is apparent that the 3 dB half-power beam width was narrower than in "Analysis 3".

It is apparent therefrom that antenna gain in the zenith direction is improved by disposing the duplex EBG structure 20. Note that although in "Analysis 4", for convenience a glass plate lacking a metal frame was employed as the model, similar results are obtained for a (roof glass) model including a metal frame such as in Example 1.

Analysis 5

Figure 16:
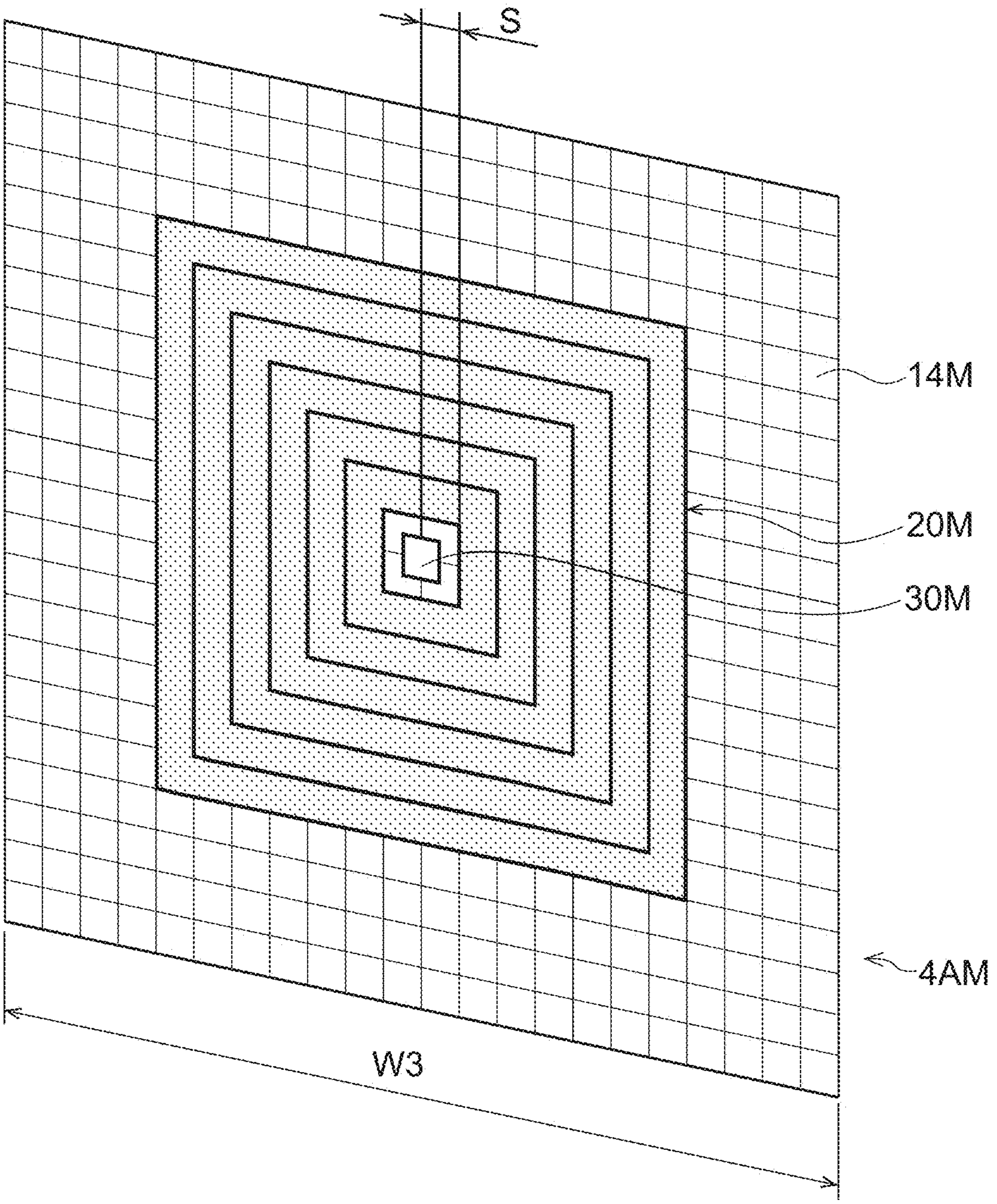
FIG. 16 is an analysis model chart illustrating an analysis model in which an antenna and a six-fold EBG structure are disposed on a glass plate.

FIG. 16 is an analysis model chart of an antenna disposed on a glass plate lacking a metal frame. As illustrated in FIG. 16, in "Analysis 5" a vehicle antenna device model 4AM of an Example 5 was generated, serving as a working example of the first exemplary embodiment. The Example 5 vehicle antenna device model 4AM includes a roof glass model 14M serving as an analysis model of the roof glass 14, an antenna model 30M serving as an analysis model of the antenna 30, and an EBG structure model 20M having a six-fold structure serving as an analysis model of the EBG structure 20.

The antenna model 30M is disposed at the vehicle width direction center and the vehicle front-rear direction center of the roof glass model 14M. The roof glass model 14M has a rectangular shape with a vehicle width direction width W3 of 807.4 mm. A distance S from a center of the antenna model 30M to an inner edge of the EBG structure model 20M was 36.7 mm.

Figure 17A:
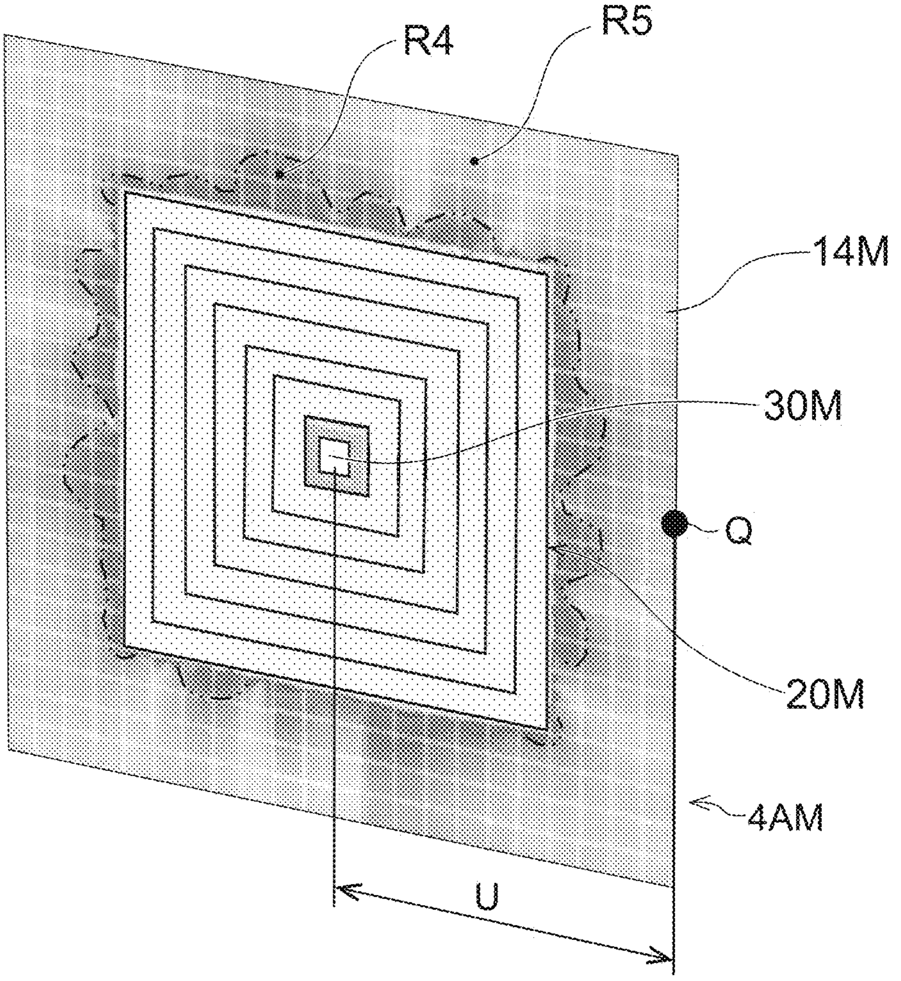
FIG. 17A is an analysis chart illustrating analysis results of the analysis model illustrated in FIG. 16, and illustrates an electric field distribution.
Figure 17B:
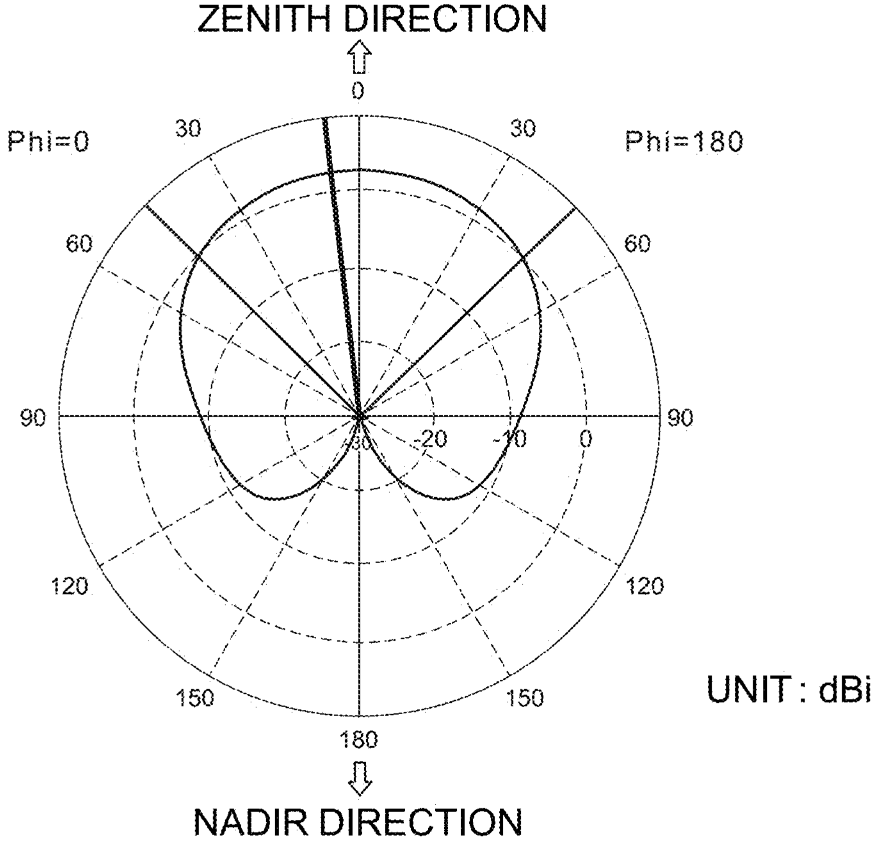
FIG. 17B is an analysis chart illustrating analysis results of the analysis model illustrated in FIG. 16, and illustrates directionality characteristics.

Field distribution analysis was performed on the Example 5 vehicle antenna device model 4AM generated as described above. FIG. 17A is an electric field distribution chart in "Analysis 5" along a glass plane of the antenna model 30M. Moreover, FIG. 17B is analysis results in "Analysis 5" indicating antenna gain and directionality of the antenna model 30M when viewed along a vehicle horizontal direction.

It is apparent from FIG. 17A that a fourth region R4 is formed slightly to the outside of the EBG structure model 20M. Moreover, electric field strength at a measurement point Q separated from the antenna model 30M by a distance U in the vehicle width direction was 1.7 V/m.

It is apparent therefrom that surface waves propagating in the roof glass 14 are suppressed by disposing the EBG structure 20 having a six-fold structure.

Moreover, directionality analysis was performed on the Example 5 vehicle antenna device model 4AM generated as described above for vertical plane dextrorotatory polarized waves having a frequency of 1.57542 GHz.

As is apparent from FIG. 17B, analysis results such as the following were obtained.

Size of main lobe: 3.06 dBi

Direction of main lobe: 7.0 degrees 3 dB half-power beam width: 90.9 degrees

Moreover, it is apparent from FIG. 17B that in "Analysis 5" no ripple in the antenna gain was generated, and stable directionality was obtained. Furthermore, it is apparent that the 3 dB half-power beam width was narrower than in "Analysis 3".

It is apparent therefrom that antenna gain in the zenith direction was improved by disposing the EBG structure 20 having a six-fold structure. Note that although in "Analysis 5", for convenience, a glass plate lacking a metal frame was employed as the model, similar results are obtained for a (roof glass) model including a metal frame such as in Example 1.

First Exemplary Embodiment Operation

Next, description follows regarding operation and advantageous effects of the EBG structure-attached glass plate 4 and the vehicle antenna device 4A of the first exemplary embodiment.

In the first exemplary embodiment, propagation of radio waves on the surface of the roof glass 14 surface when the antenna 30 is transmitting and receiving radio waves in the radio wave transmitting and receiving region 30A is suppressed by disposing the EBG structure 20 on the second main face 14A of the roof glass 14. This means that the radio waves transmitted and received in the radio wave transmitting and receiving region 30A can be suppressed from propagating in the glass plates and being re-radiated by the metal frame 12. As a result thereof, surface waves of the roof glass 14 are controlled, enabling a drop in antenna gain to be suppressed.

Moreover, due to the EBG structure 20 being formed so as to surround the radio wave transmitting and receiving region 30A in a frame shape, the propagation of radio wave can be suppressed even in one or other direction of in-plane directions of the roof glass 14 when the antenna 30 has transmitted and received radio waves in the radio wave transmitting and receiving region 30A. This means that radio waves transmitted and received by the antenna 30 of the radio wave transmitting and receiving region 30A can be suppressed from propagating in the glass plate and being re-radiated by the metal frame. As a result thereof, surface waves of the roof glass 14 are controlled, and a drop in antenna gain can be sufficiently suppressed.

Furthermore, the EBG structure 20 is disposed eccentrically from the centroid P2 of the roof glass 14 by forming D2 and D4 longer than the longest distance L from the centroid P1 of the radio wave transmitting and receiving region 30A to the outer edge of the radio wave transmitting and receiving region 30A. This means that EBG structure 20 and the radio wave transmitting and receiving region 30A can be made less visible to an occupant.

Moreover, when the radio wave transmitting and receiving region 30A is a rectangular shape, the rectangular shaped antenna 30 can be placed at an appropriate position in the radio wave transmitting and receiving region 30A. This means that, for example, an ordinary patch antenna can be appropriately disposed inside the radio wave transmitting and receiving region 30A.

The position of the centroid of the EBG structure 20 may be a different position from the position of the centroid P2 of the roof glass 14, for example the position of the centroid may be formed at a position eccentric to the roof glass 14, by making D1 different from at least one of D2, D3, or D4. As a result thereof the EBG structure 20 is disposed so as to secure visibility to an occupant.

Propagation of radio waves at the roof glass 14 surface when transmitting and receiving radio waves in the radio wave transmitting and receiving region 30A is better suppressed by the EBG structure 20 being duplex or higher order structure arranged alongside each other. This thereby enables radio waves transmitted and received by the antenna 30 of the radio wave transmitting and receiving region 30A to be better suppressed from propagating in the roof glass 14 and being re-radiated at the metal frame 12. As a result thereof, the EBG structure-attached glass plate 4 is able to sufficiently control the surface waves of the roof glass 14, enabling a drop in antenna gain to be suppressed.

The EBG structure 20 is formed so as not to protrude out from the second main face 14A of the roof glass 14 by disposing the planar shaped EBG structure 20 at the second main face 14A of the roof glass 14. This thereby enables in-vehicle space to be less liable to be narrowed by the EBG structure 20.

Moreover, in the vehicle antenna device 4A, the radiation face 36C of the antenna 30 is attached in a state not in contact with the roof glass 14 by the radiation face 36C being separated from the roof glass 14. Note that the radiation face 36C may contact an internal face of the roof glass 14, and such cases facilitate realizing a saving in space.

Moreover, in the vehicle antenna device 4A the radiation face 36C of the antenna 30 is disposed facing in the zenith direction by the radiation face 36C being disposed substantially parallel to a horizontal plane. Note that reference to substantially parallel to a horizontal plane indicates being within a range of ±15° with respect to the horizontal plane, may be within a range of ±10°, may be within a range of ±5°, and may be within a range of ±3°, however is most preferably at 0° with respect to a horizontal direction. This means that the antenna gain is improved of the vehicle antenna device 4A including an antenna employed for satellite communication, such as a GNSS.

Second Exemplary Embodiment

An EBG structure-attached glass plate and a vehicle antenna device of the second exemplary embodiment differ from the EBG structure-attached glass plate and the vehicle antenna device of the first exemplary embodiment mainly in the point that the configuration of the antenna is different.

Configuration

Description follows regarding a configuration of the EBG structure-attached glass plate and the vehicle antenna device of the second exemplary embodiment. Note that the description will use the same terms and reference numerals for description of the same or equivalent portions to in the content described in the first exemplary embodiment.

Windshield 16

Figure 18:
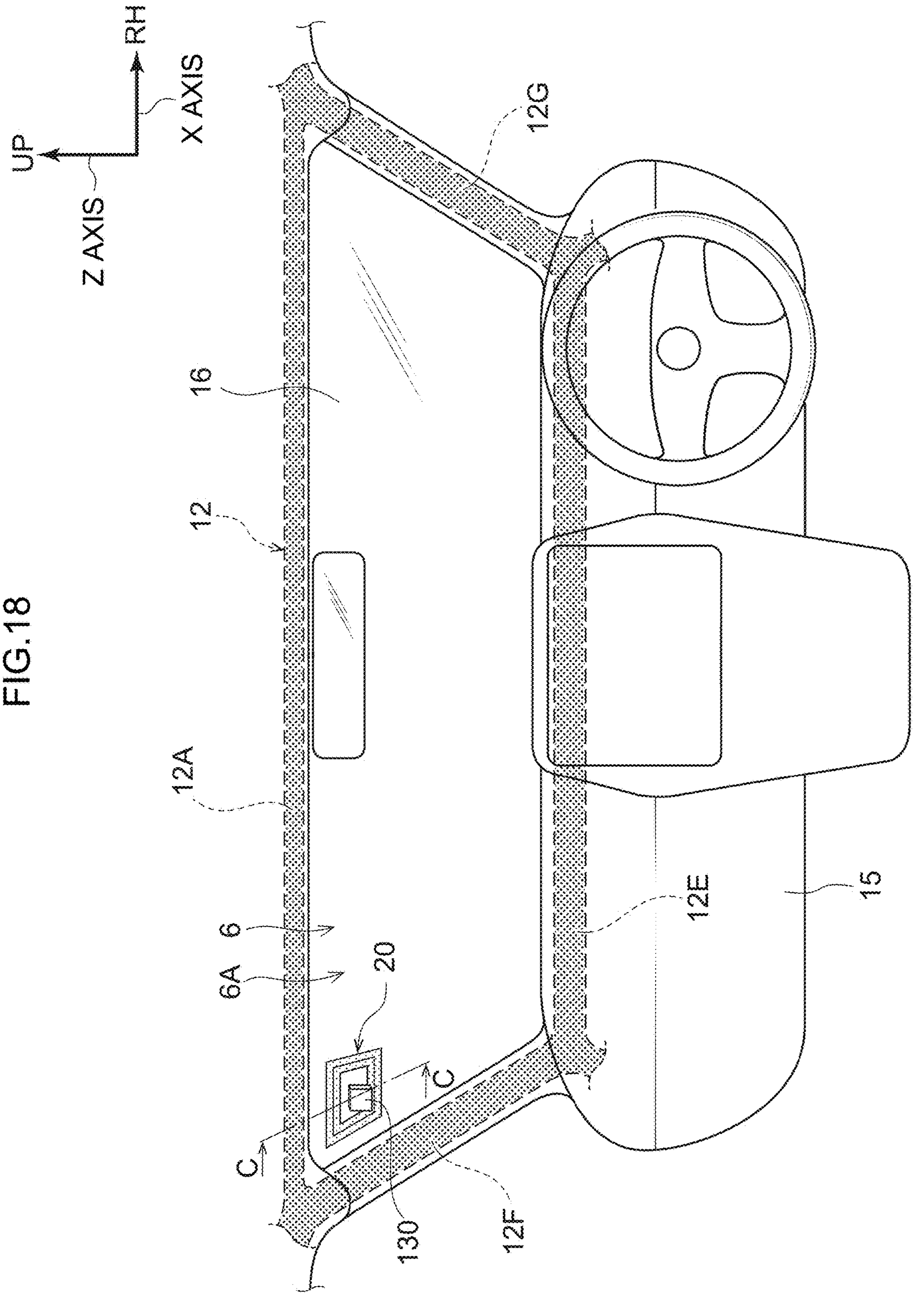
FIG. 18 is a perspective view of a windshield according to a second exemplary embodiment as viewed looking in a vehicle forward direction from inside a vehicle cabin.
Figure 19:
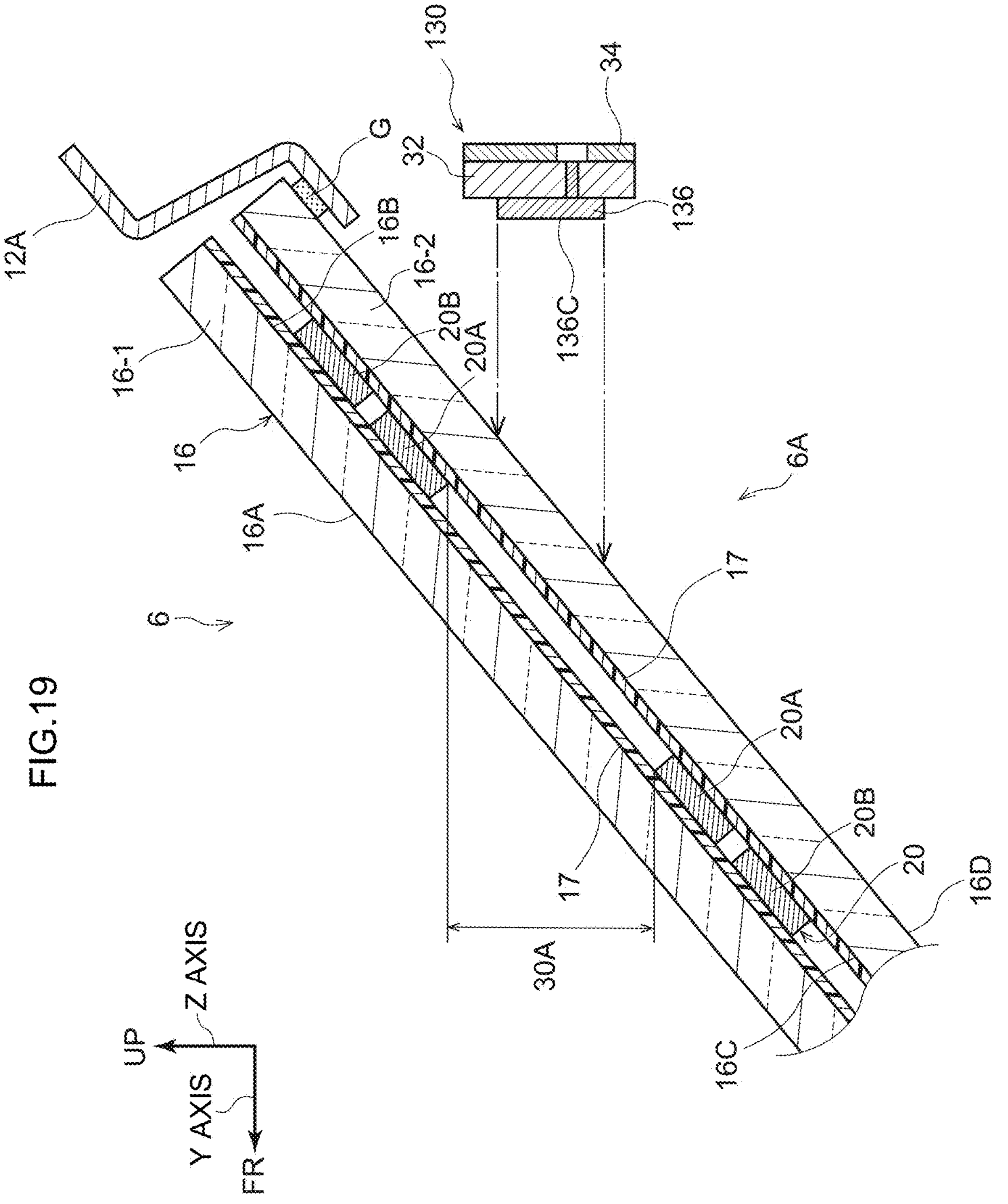
FIG. 19 is a cross-section illustrating a windshield according to a second exemplary embodiment illustrated in a cross-section taken along C-C of FIG. 18.

FIG. 18 illustrates a vehicle antenna device 6A including a windshield 16 as viewed from a vehicle cabin inside, and FIG. 19 is a cross-section taken along cross-section C-C in FIG. 18. As illustrated in FIG. 18, the windshield 16 is disposed in the vehicle up-down direction above an instrument panel 15, and is formed in a substantially rectangular plate shape. As illustrated in FIG. 19, often the windshield 16 is provided so as to have a plate thickness direction that is a direction inclined from a vertical direction in a vehicle diagonally forward direction. For example, an angle formed between a horizontal direction (in this case the vehicle front-rear direction) and the windshield 16 is 22.5°.

The windshield 16 is a laminated glass including a first glass plate 16-1, a second glass plate 16-2, and intermediate films 17.

The first glass plate 16-1 includes a first main face 16A serving as a main face on the vehicle cabin outside, and a second main face 16B serving as a main face on the vehicle cabin inside. The second glass plate 16-2 includes a third main face 16C serving as a main face on a vehicle cabin outside, and a fourth main face 16D serving as a main face on the vehicle cabin inside.

The intermediate films 17 are respectively stuck to the second main face 16B and the third main face 16C, and the two layers of the intermediate film 17 are interposed between the first glass plate 16-1 and the second glass plate 16-2. The intermediate films 17 may, for example, employ a thin film formed from a polyvinyl butyral (PVB), an ethylene vinyl acetate copolymer resin (EVA) or a cyclo olefin polymer (COP).

The EBG structure 20 is interposed between the two layers of the intermediate film 17. Note that FIG. 19 illustrates a simplification of a manner in which the EBG structure 20 is disposed in the laminated glass, however in reality the thin film EBG structure 20 is encapsulated without leaving any gaps between the two layers of the intermediate film 17. Moreover, a thickness of each of the two layers of the intermediate film 17 may, for example, be 0.38 mm.

Moreover, the EBG structure 20 may be disposed on at least one face of a (single layer) intermediate film 17 (of for example, 0.76 mm thickness). Namely, the EBG structure 20 may have a thickness of, for example, about 10 μm to 20 μm, may be formed to at least one of the second main face 16B or the third main face 16C, or may be formed to both thereof. In such cases, the EBG structure 20 may be formed in a thin film shape having a planar shape thinner than the intermediate film 17, and may be formed to at least one of the first glass plate 16-1 or the second glass plate 16-2. Moreover, a shape of the conductor pattern 26 of the EBG structure 20 and a size thereof may be matched to the inclined windshield 16, and have a rectangular loop shape with an appropriately adjusted width or the like.

As illustrated in FIG. 19, the EBG structure 20 and an antenna 130 are disposed on the windshield 16. The windshield 16 to which the EBG structure 20 is attached configures an EBG structure-attached glass plate 6. The windshield 16, the EBG structure 20, and the antenna 130 configure a vehicle antenna device 6A.

Note that the EBG structure 20 and the antenna 130 may be provided to the rear glass 18, and may be provided to a side glass.

Metal Frame 12

As illustrated in FIG. 18, the metal frame 12 formed in a substantially rectangular frame shape is disposed at a peripheral edge of the windshield 16. The metal frame 12 includes a first metal frame-piece 12A disposed at a vehicle up-down direction upper side, a fifth metal frame 12E disposed at a vehicle up-down direction lower side, a sixth metal frame 12F disposed at a vehicle width direction left side, and a seventh metal frame 12G disposed at a vehicle width direction right side.

An vehicle up-down direction upper side end of the windshield 16 is attached to the first metal frame-piece 12A, and a lower side end thereof is attached to the fifth metal frame 12E. Moreover, a vehicle width direction left side end of the windshield 16 is attached to the sixth metal frame 12F, and a right side end thereof is attached to the seventh metal frame 12G.

Antenna 130

The antenna 130 is a patch antenna (microstrip antenna) serving as a V2X antenna that transmits and receives vertically polarized waves (an example of radio waves) in a 5.8 GHz band or 5.9 GHz band employed for vehicle-to-vehicle communication, roadside-to-vehicle communication, or the like.

The antenna 130 is configured substantially the same as the antenna 30 illustrated in the first exemplary embodiment, except in the configuration of a radiation plate 136 being different. A front view shape of the radiation plate 136 is a square shape without cut outs (as on the radiation plate 36 previously described). However, a front view shape of the radiation plate 136 may be a rectangular shape other than a square shape, may be an oblong shape, a polygon shape, or a circular shape.

As illustrated in FIG. 18, in a state viewed from the vehicle cabin inside in a vehicle front direction, the antenna 130 is disposed further to an upper side than a vehicle up-down direction center of the windshield 16 and further to a left side than a vehicle width direction center. In other words, the antenna 130 is disposed in the vicinity of an internal corner between the first metal frame-piece 12A and the sixth metal frame 12F.

As illustrated in FIG. 19, the antenna 30 is attached to the metal frame 12 or the windshield 16 through a non-illustrated bracket such that a radiation face 136C of the radiation plate 136 is separated from the windshield 16. The antenna 130 is provided further to the vehicle cabin inside than the radiation face 136C. The antenna 130 is attached in a state in which a normal to the radiation face 136C faces in a horizontal direction. In other words, the antenna 130 is attached with the radiation face 136C substantially parallel to the vertical direction. Note that reference here to substantially parallel to the vertical direction indicates within a range of ±15° with respect to the vertical direction, and may be within a range of ±10°, may be within a range of ±5°, may be within a range of ±3°, and may be at 0°.

The radio wave transmitting and receiving region 30A is formed so as to be wider than a region of the external shape of the radiation face 136C projected horizontally onto the windshield 16.

Second Exemplary Embodiment Operation

Next, description follows regarding the operation and advantageous effects of the EBG structure-attached glass plate 6 and the vehicle antenna device 6A of the second exemplary embodiment.

In the EBG structure-attached glass plate 6 of the second exemplary embodiment, the windshield 16 is a laminated glass including a first glass plate 16-1, a second glass plate 16-2, and an intermediate film 17 interposed between the first glass plate 16-1 and the second glass plate 16-2.

For example, the EBG structure 20 is not externally exposed due to disposing the EBG structure 20 between the first glass plate 16-1 and the second glass plate 16-2. This enables the EBG structure 20 to be protected.

Due to disposing the radiation face 136C substantially parallel to the vertical direction, the radiation face 136C is able to secure directionality in the horizontal direction for radio waves being transmitted and received in vehicle-to-vehicle communication, roadside-to-vehicle communication, and the like. The vehicle antenna device 6A is in this manner able to improve antenna gain in the horizontal direction as well as to obtain the desired directionality.

Note that other configuration and operation advantageous effects are substantially the same as those of the exemplary embodiment described above, and so explanation thereof will be omitted.

Third Exemplary Embodiment

An EBG structure-attached glass plate and a vehicle antenna device of a third exemplary embodiment differ from the EBG structure-attached glass plate and the vehicle antenna device of the second exemplary embodiment in that the EBG structure is arranged differently thereto.

Figure 20:
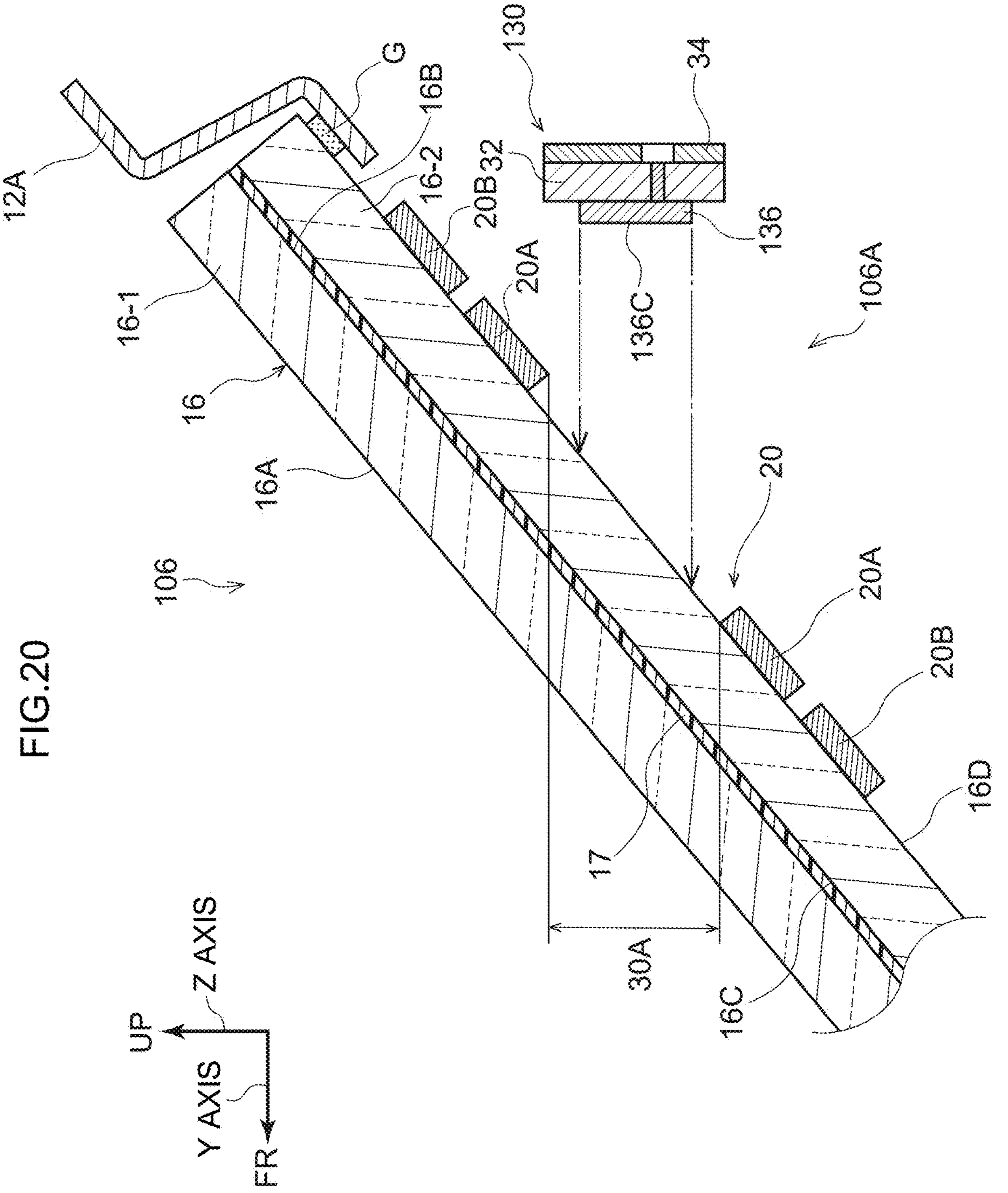
FIG. 20 is a cross-section illustrating a windshield according to a third exemplary embodiment illustrated in the cross-section taken along C-C of FIG. 18.

FIG. 20 is a cross-section taken along cross-section C-C in FIG. 18, and illustrates an arrangement of the EBG structure different from that of the second exemplary embodiment. As illustrated in FIG. 20, an intermediate film 17 is interposed between a second main face 16B and a third main face 16C. The intermediate film 17 (of for example 0.76 mm thickness) is interposed between a first glass plate 16-1 and a second glass plate 16-2. The EBG structure 20 is stuck to a fourth main face 16D.

Third Exemplary Embodiment Operation

Next, description follows regarding the operation and advantageous effects of an EBG structure-attached glass plate 106 and a vehicle antenna device 106A of the third exemplary embodiment.

In the EBG structure-attached glass plate 106 of the third exemplary embodiment, the EBG structure 20 is disposed on the fourth main face 16D that is on the opposite side of the second glass plate 16-2 to the first glass plate 16-1 side.

The EBG structure 20 is formed externally to the windshield 16 by disposing the EBG structure 20 on the fourth main face 16D. This thereby facilitates retrofitting of the EBG structure 20, such as by attaching to the windshield 16.

Note that other configuration and operation and advantageous effects are substantially the same as those of the exemplary embodiments described above, and so explanation thereof will be omitted.

Fourth Exemplary Embodiment

Figure 21:
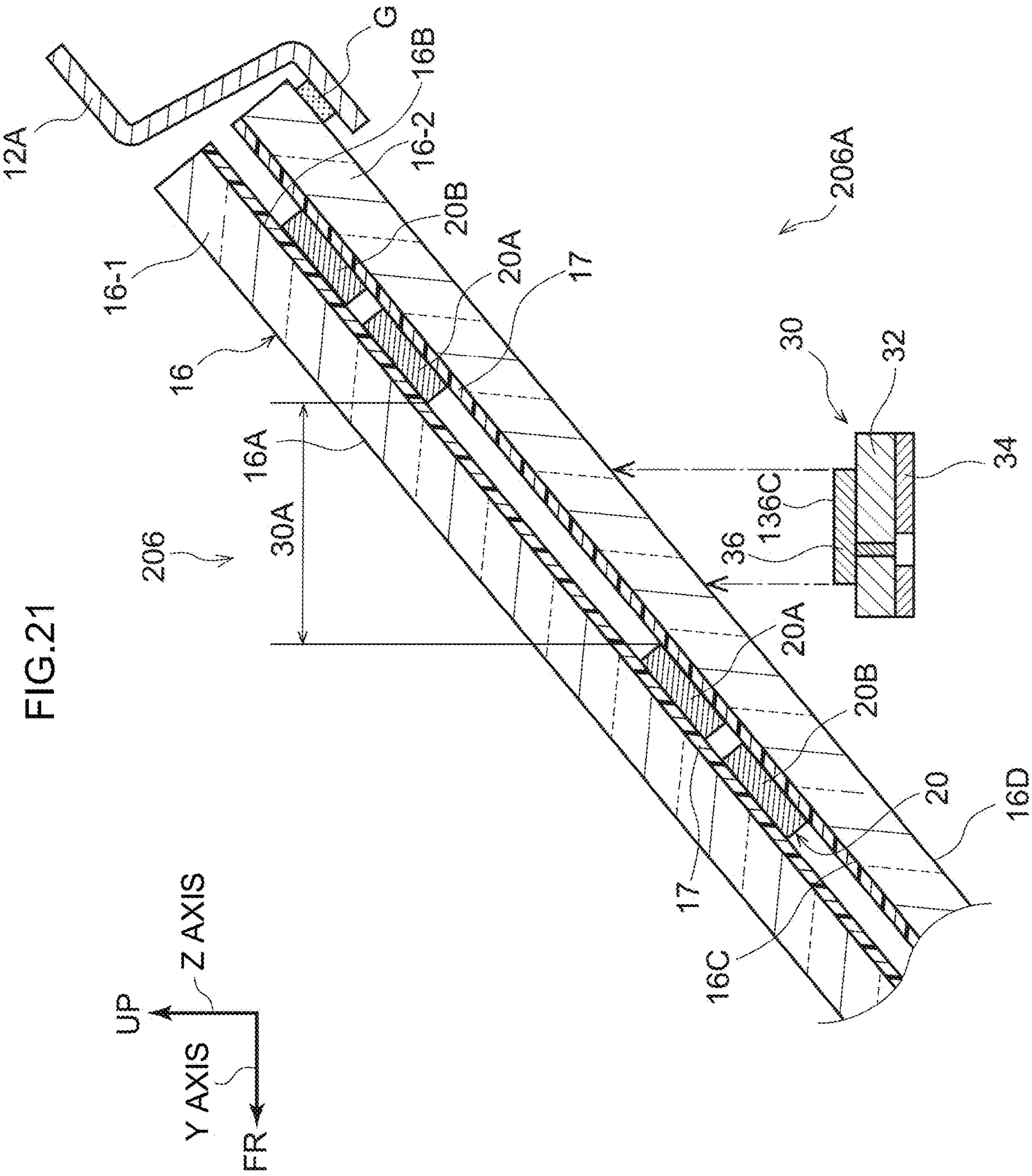
FIG. 21 is a cross-section illustrating a windshield according to a fourth exemplary embodiment illustrated in the cross-section taken along C-C of FIG. 18.

In the second exemplary embodiment and the third exemplary embodiment examples have been given in which the antenna 130 serving as a V2X antenna is attached to the windshield 16 such that the radiation face 136C is substantially parallel to a horizontal plane. FIG. 21 is a cross-section taken along C-C in FIG. 18, and illustrates an EBG structure-attached glass plate 206 and a vehicle antenna device 206A of the fourth exemplary embodiment.

As illustrated in FIG. 21, the vehicle antenna device 206A of the present exemplary embodiment is an example of a satellite communication antenna, with an antenna 30 employed as a GNSS antenna, and attached to the windshield 16 such that the radiation face 136C is substantially parallel to a horizontal plane. In such cases, the radio wave transmitting and receiving region 30A can be formed wider than a region of the external shape of the radiation face 136C vertically projected onto the windshield 16. Moreover, the antenna 30 serving as the GNSS antenna may be attached to the rear glass 18 such that the radiation face 136C is substantially parallel to a horizontal plane. Furthermore, in the vehicle antenna device 206A including a satellite communication antenna, the antenna 30 may be attached to at least one of the windshield 16 or the rear glass 18 such that the vehicle cabin inside glass face is parallel to the radiation face 136C, namely so as to match the attachment angle of the glass with respect to a horizontal plane (for example, 22.5). Such a configuration enables a saving in space to be made for the space inside the vehicle cabin where the antenna 30 is disposed.

The EBG structure-attached glass plate and the vehicle antenna device have been described above based on the above exemplary embodiments. However, specific configurations are not limited to those of these exemplary embodiments, and design changes and the like are permitted without departing from the spirit of the invention according to each of the claims of the scope of patent claims.

In the above exemplary embodiments the EBG structure 20 was illustrated for an example formed continuously so as to surround the radio wave transmitting and receiving region 30A. However, the EBG structure is not limited so such an embodiment and, for example, may be formed so as to surround the radio wave transmitting and receiving region 30A with plural EBG structures.

In the exemplary embodiment described above the EBG structure 20 was illustrated for an example formed in a rectangular frame shape. However, the EBG structure may lack at least one side for forming a rectangle, and may have another shape such as a polygon shape or a circular shape.

In the above exemplary embodiments, the EBG structure 20 was illustrated for an example of a duplex arranged alongside each other so as to configure a rectangular shaped closed loop. However, the EBG structure 20 may be arranged as a simplex, or may be a triplex or higher order structure arranged alongside each other.

In the above exemplary embodiments, the EBG structure 20 was illustrated for an example in which the substrate 22 and the conductor portion 24 were formed in thin plate shaped planer shapes. However, the EBG structure is not limited to such embodiments, and may be configured by a metal patch on a dielectric substrate, and by a metal via for connecting between the patch and a ground conductor on a back face of the substrate, in a three dimensional shape of a so-called mushroom structure, and may be any general EBG structure.

In the above exemplary embodiments the antennas 30, 130 and the EBG structure 20 were illustrated for examples disposed in the vicinity of a corner of the roof glass 14 or the windshield 16. However, the position where the EBG structure is provided is not limited to these embodiments and, for example, the EBG structure may be provided in the vicinity of a vehicle width direction center.

In the above exemplary embodiments the antennas 30, 130 and the EBG structure 20 were illustrated for examples provided to the roof glass 14 or the windshield 16. However, the antenna and the EBG structure are not limited to such embodiments and, for example as illustrated in FIG. 1, may be provided to the rear glass 18, and may be provided to a side glass.

In the above exemplary embodiments the roof glass 14 and the windshield 16 were illustrated for examples formed in substantially rectangular plate shapes. However, the roof glass and the windshield are not limited to such embodiments, and may be formed in other shapes.

In the exemplary embodiments described above, the radio wave transmitting and receiving region 30A was illustrated for examples in which it was formed in a rectangular shape. However, the radio wave transmitting and receiving region is not limited to such embodiments and, for example, may be formed in another shape such as a polygon shape or a circular shape.

In the above exemplary embodiment the metal frame 12 was illustrated for an example disposed at the peripheral edge of the roof glass 14 and the windshield 16, and formed in a substantially rectangular frame shape. However, the metal frame may be configured with part of a substantially rectangular frame shape missing.

In the above exemplary embodiment the antenna 30 serves as a GNSS antenna, and the antenna 130 was illustrated for an example serving as a V2X antenna. However, the antenna can be applied to various antennas, such as an antenna for receiving broadcast radio waves, an antenna used in ITS, a 1.2 GHz band antenna, or the like.

In the above exemplary embodiments the EBG structure-attached glass plates 4, 6, 106, 206 and the vehicle antenna devices 4A, 6A, 106A, 206A were illustrated for examples applied to the roof glass 14 or the windshield 16. However, the EBG structure-attached glass plate and the vehicle antenna device are not limited to such embodiments and, for example, may be applied to the rear glass 18.

In the above exemplary embodiments the EBG structure-attached glass plates 4, 6, 106, 206 and the vehicle antenna device were illustrated for examples applied to the vehicle 10 including the roof glass 14. However, the EBG structure-attached glass plate and the vehicle antenna device may be applied to a vehicle lacking a roof glass.

What is claimed is:

1. An EBG structure-attached glass plate comprising:

a vehicle glass plate attached to a metal frame of a vehicle body;

an EBG structure that is disposed on a main face of the glass plate, that has a predetermined conductor pattern periodically disposed thereon, and that is formed in a frame shape; and a radio wave transmitting and receiving region surrounded by the EBG structure, wherein the EBG structure includes the conductor pattern arranged alongside as a duplex or higher order structure between the radio wave transmitting and receiving region and the metal frame and the EBG structure comprises a first EBG structure and a second EBG structure arranged alongside each other in a plan view with the second EBG structure being at an outer periphery of the first EBG structure.

2. The EBG structure-attached glass plate of claim 1, wherein when viewed along a plate thickness direction of the glass plate, a shortest distance from an outer edge of the EBG structure to at least one side of the glass plate is formed longer than a longest distance from a centroid of the radio wave transmitting and receiving region to an outer edge of the radio wave transmitting and receiving region.

3. The EBG structure-attached glass plate of claim 1, wherein the radio wave transmitting and receiving region has a rectangular shape when viewed along a thickness direction of the glass plate.

4. The EBG structure-attached glass plate of claim 1, wherein a shortest distance from a first side configuring an outer edge of the glass plate to an outer edge of the EBG structure is different from a shortest distance from a second side configuring an outer edge of the glass plate to an outer edge of the EBG structure.

5. The EBG structure-attached glass plate of claim 1, wherein the EBG structure is disposed in a vicinity of a corner of the glass plate.

6. The EBG structure-attached glass plate of claim 1, wherein the EBG structure has a planar shape and is arranged on a main face of the glass plate.

7. The EBG structure-attached glass plate of claim 1, wherein:

the glass plate is laminated glass including a first glass plate, a second glass plate, and an intermediate film interposed between the first glass plate and the second glass plate; and the EBG structure is disposed between the first glass plate and the second glass plate.

8. The EBG structure-attached glass plate of claim 1, wherein:

the glass plate is laminated glass including a first glass plate, a second glass plate, and an intermediate film interposed between the first glass plate and the second glass plate; and the EBG structure is disposed on a main face of the second glass plate on the opposite side to the first glass plate side.

9. A vehicle antenna device comprising:

the EBG structure-attached glass plate of claim 1; and an antenna including a radiation face disposed facing toward the radio wave transmitting and receiving region.

10. The vehicle antenna device of claim 9, wherein the radiation face is separated from the glass plate.

11. The vehicle antenna device of claim 9, wherein the antenna is a satellite communication antenna.

12. The vehicle antenna device of claim 11, wherein the antenna is a GNSS antenna.

13. The vehicle antenna device of claim 11, wherein the radiation face is disposed substantially parallel to a horizontal plane.

14. The vehicle antenna device of claim 9, wherein the glass plate is a roof glass, a windshield, or a rear glass.

15. The vehicle antenna device of claim 9, wherein the radiation face is disposed substantially parallel to a vertical direction.

16. The vehicle antenna device of claim 15, wherein:

the glass plate is a windshield, a rear glass, or a side glass; and the antenna is a V2X antenna.

17. The EBG structure-attached glass plate of claim 1, wherein the second EBG structure is concentric with the first EBG structure.

18. The EBG structure-attached glass plate of claim 1, wherein the conductor pattern comprises a conductor portion comprising a main patch, sub patches and bridge portions.

* * * * *